United States Patent
Li et al.

(10) Patent No.: US 12,317,231 B2
(45) Date of Patent: May 27, 2025

(54) METHOD AND APPARATUS OF HANDLING INTER-DEVICE COORDINATION FOR SIDELINK COMMUNICATION IN A WIRELESS COMMUNICATION SYSTEM

(71) Applicant: ASUSTek Computer Inc., Taipei (TW)

(72) Inventors: Ming-Che Li, Taipei (TW); Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 48 days.

(21) Appl. No.: 17/475,012

(22) Filed: Sep. 14, 2021

(65) Prior Publication Data
US 2022/0086803 A1 Mar. 17, 2022

Related U.S. Application Data

(60) Provisional application No. 63/079,638, filed on Sep. 17, 2020.

(51) Int. Cl.
*H04W 72/02* (2009.01)
*H04W 28/26* (2009.01)
(Continued)

(52) U.S. Cl.
CPC ........... *H04W 72/02* (2013.01); *H04W 28/26* (2013.01); *H04W 72/0446* (2013.01);
(Continued)

(58) Field of Classification Search
CPC ... H04W 72/02; H04W 72/04; H04W 72/044; H04W 72/0457; H04W 72/0453;
(Continued)

(56) References Cited

U.S. PATENT DOCUMENTS

2019/0394786 A1 12/2019 Parron et al.
2020/0267729 A1* 8/2020 Kim ...................... H04W 72/20
(Continued)

FOREIGN PATENT DOCUMENTS

CN 109792718 A 5/2019
EP 3603293 B1 * 3/2018
(Continued)

OTHER PUBLICATIONS

Corresponding Korean Patent No. 10-2021-0122274, Office Action dated Jul. 18, 2023, 8 pages.
(Continued)

*Primary Examiner* — Phong La
(74) *Attorney, Agent, or Firm* — Cooper Legal Group LLC

(57) ABSTRACT

A method and apparatus are disclosed from the perspective of a first device to perform sidelink communication. In one embodiment, the first device sends or reports a resource set to a second device, wherein the resource set comprises one or more sidelink resources in one or more slots in a carrier or cell. Furthermore, when the first device performs sidelink resource (re-)selection procedure for selecting a first sidelink resource in the carrier or cell, the first device prevents or precludes from selecting or determining (any) sidelink resources in the one or more slot in the carrier or cell for selecting the first sidelink resource.

20 Claims, 11 Drawing Sheets

(51) Int. Cl.
  *H04W 72/04* (2023.01)
  *H04W 72/0446* (2023.01)
  *H04W 72/0453* (2023.01)
  *H04W 72/20* (2023.01)
  *H04W 72/56* (2023.01)

(52) U.S. Cl.
  CPC ....... *H04W 72/0453* (2013.01); *H04W 72/20* (2023.01); *H04W 72/56* (2023.01)

(58) Field of Classification Search
  CPC . H04W 72/0446; H04W 72/18; H04W 72/20; H04W 72/24; H04W 72/26; H04W 72/231; H04W 72/232; H04W 72/40; H04W 72/56; H04W 72/566
  See application file for complete search history.

(56) References Cited

U.S. PATENT DOCUMENTS

| | | | |
|---|---|---|---|
| 2020/0296690 A1* | 9/2020 | Lee | H04W 4/40 |
| 2020/0367113 A1 | 11/2020 | Tang | |
| 2021/0144681 A1* | 5/2021 | Gulati | H04W 24/08 |
| 2021/0235328 A1* | 7/2021 | Hui | H04W 72/56 |
| 2021/0266951 A1* | 8/2021 | Gulati | H04B 17/327 |
| 2022/0272726 A1* | 8/2022 | Wang | H04L 5/0055 |
| 2022/0330038 A1* | 10/2022 | Ganesan | H04W 52/10 |
| 2023/0020105 A1* | 1/2023 | Shin | H04W 72/543 |

FOREIGN PATENT DOCUMENTS

| | | | | |
|---|---|---|---|---|
| EP | 4135436 A1 | * | 2/2023 | |
| KR | 4135436 | * | 5/2021 | ............ H04W 72/04 |
| TW | 202107932 A | * | 2/2021 | ........ H04W 28/0278 |
| WO | WO 2020173536 | * | 9/2020 | ............ H04W 72/02 |
| WO | 2021098858 | | 5/2021 | |
| WO | WO-2022034485 A1 | * | 2/2022 | |

OTHER PUBLICATIONS

Moderator (LG Electronics) "Summary for AI 8.11.2.2 Feasibility and benefits for Mode 2 Enhancements", #3GPP, TSG RAN WG1 #102-e, R1-2007412, e-Meeting, Aug. 17-28, 2020, 33 pages.
Nokia, Nokia Shanghai Bell, Resource Announcement and Reservation Procedure for Mode 2 NR V2X, 3GPP TSG-RAN WG2 Meeting #105bis, R2-1904279, Xi'an, China, Apr. 8-12, 2019, 3 pages.
Corresponding Chinese Patent No. 202111074833.9, Office Action dated Sep. 11, 2023, 20 pages.
Futurewei: "Views on Resource Allocation Enhancements for Sidelink Communication", 3GPP, TSG RAN WG1 Meeting #102-e, R1-2005296, e-Meeting, Aug. 17-28, 2020, 3 pages.

* cited by examiner

| $\mu_{SL}$ | $T^{SL}_{proc,0}$ [slots] |
|---|---|
| 0 | 1 |
| 1 | 1 |
| 2 | 2 |
| 3 | 4 |

FIG. 5 (PRIOR ART)

| $\mu_{SL}$ | $T^{SL}_{proc,1}$ [slots] |
|---|---|
| 0 | 3 |
| 1 | 5 |
| 2 | 9 |
| 3 | 17 |

FIG. 6 (PRIOR ART)

| Value of 2nd-stage SCI format field | 2nd-stage SCI format |
|---|---|
| 00 | SCI format 2-A |
| 01 | SCI format 2-B |
| 10 | Reserved |
| 11 | Reserved |

FIG. 7 (PRIOR ART)

| Value of Beta_offset indicator | Beta_offset index in Table 9.3-2 of [5, TS38.213] |
|---|---|
| 00 | 1st index provided by higher layer parameter *sl-BetaOffsets2ndSCI* |
| 01 | 2nd index provided by higher layer parameter *sl-BetaOffsets2ndSCI* |
| 10 | 3rd index provided by higher layer parameter *sl-BetaOffsets2ndSCI* |
| 11 | 4th index provided by higher layer parameter *sl-BetaOffsets2ndSCI* |

FIG. 8 (PRIOR ART)

| Value of the Number of DMRS port field | Antenna ports |
|---|---|
| 0 | 1000 |
| 1 | 1000 and 1001 |

FIG. 9 (PRIOR ART)

| Value of Cast type indicator | Cast type |
|---|---|
| 00 | Broadcast |
| 01 | Groupcast |
| 10 | Unicast |
| 11 | Reserved |

FIG. 10 (PRIOR ART)

METHOD AND APPARATUS OF HANDLING INTER-DEVICE COORDINATION FOR SIDELINK COMMUNICATION IN A WIRELESS COMMUNICATION SYSTEM

CROSS-REFERENCE TO RELATED APPLICATIONS

The present Application claims the benefit of U.S. Provisional Patent Application Ser. No. 63/079,638 filed on Sep. 17, 2020, the entire disclosure of which is incorporated herein in its entirety by reference.

FIELD

This disclosure generally relates to wireless communication networks, and more particularly, to a method and apparatus of handling inter-device coordination for sidelink communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first device to perform sidelink communication. In one embodiment, the first device sends or reports a resource set to a second device, wherein the resource set comprises one or more sidelink resources in one or more slots in a carrier or cell. Furthermore, when the first device performs sidelink resource (re-)selection procedure for selecting a first sidelink resource in the carrier or cell, the first device prevents or precludes from selecting or determining (any) sidelink resources in the one or more slot in the carrier or cell for selecting the first sidelink resource.

BRIEF DESCRIPTION OF THE DRAWINGS

FIG. 5 is a reproduction of Table 8.1.4-1 of 3GPP TS 38.214 V16.2.0.

FIG. 6 is a reproduction of Table 8.1.4-2 of 3GPP TS 38.214 V16.2.0.

FIG. 7 is a reproduction of Table 8.3.1.1-1 of 3GPP TS 38.212 V16.2.0.

FIG. 8 is a reproduction of Table 8.3.1.1-2 of 3GPP TS 38.212 V16.2.0.

FIG. 9 is a reproduction of Table 8.3.1.1-3 of 3GPP TS 38.212 V16.2.0.

FIG. 10 is a reproduction of Table 8.4.1.1-1 of 3GPP TS 38.212 V16.2.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.214 V16.2.0 (2020-06), "NR; Physical layer procedures for data (Release 15)"; TS 38.212 V16.2.0 (2020-06), "NR; Multiplexing and channel coding (Release 16)"; RP-201385, "WID revision: NR sidelink enhancement", LG Electronics; RAN1 #102-e, "FL summary #1 for AI 8.11.2.2 Feasibility and benefits for mode 2 enhancements"; R1-1810051, "Final Report of 3GPP TSG RAN WG1 #94 v1.0.0 (Gothenburg, Sweden, 20-24 Aug. 2018)"; R1-1909942, "Final Report of 3GPP TSG RAN WG1 #98 v1.0.0 (Prague, Czech Rep, 26th-30 Aug. 2019)"; R1-1913275, "Final Report of 3GPP TSG RAN WG1 #98bis v2.0.0 (Chongqing, China, 14-20 Oct. 2019)"; R1-2000151, "Final Report of 3GPP TSG RAN WG1 #99 v1.0.0 (Reno, USA, 18-22 Nov. 2019)"; R1-2002747, "Final Report of 3GPP TSG RAN WG1 #100-e v2.0.0 (Online meeting, 24 Feb.-6 Mar. 2020)"; R1-2003251, "Final Report of 3GPP TSG RAN WG1 #100bis-e v1.0.0 (Online meeting, 20-30 Apr. 2020)"; R1-2005201, "Final Report of 3GPP TSG RAN WG1 #101-e v1.0.0 (Online meeting, 25 May-5 Jun. 2020)"; Chairman's Notes RAN1 #102-e final (Online meeting, 17-28 Aug. 2020); R1-2005255, "Inter-UE coordination in sidelink resource allocation", Huawei, HiSilicon; and TS 38.321 V16.1.0 (2020-07), "NR; Medium Access Control (MAC) protocol specification (Release 16)". The standards and documents listed above are hereby expressly incorporated by reference in their entirety.

Figure 1:
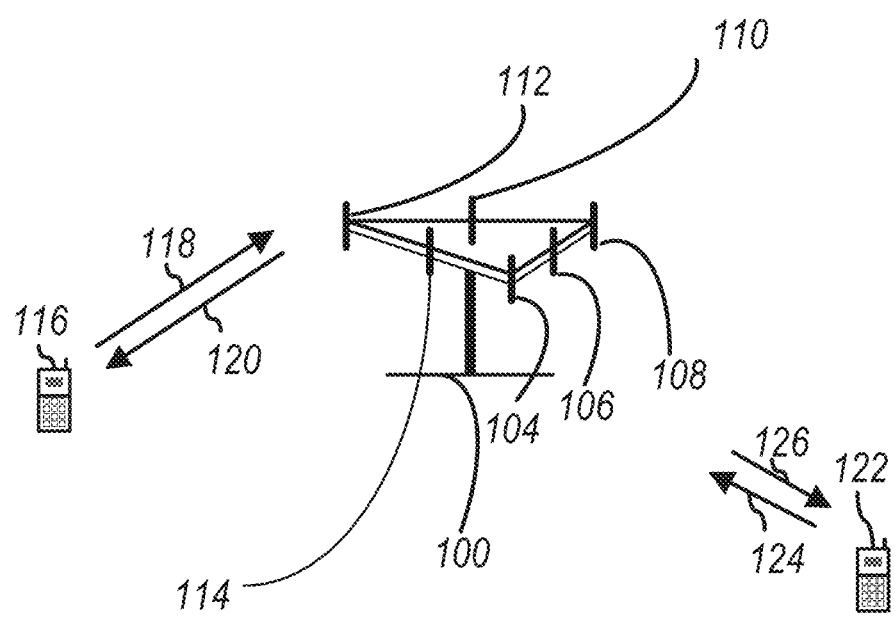
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
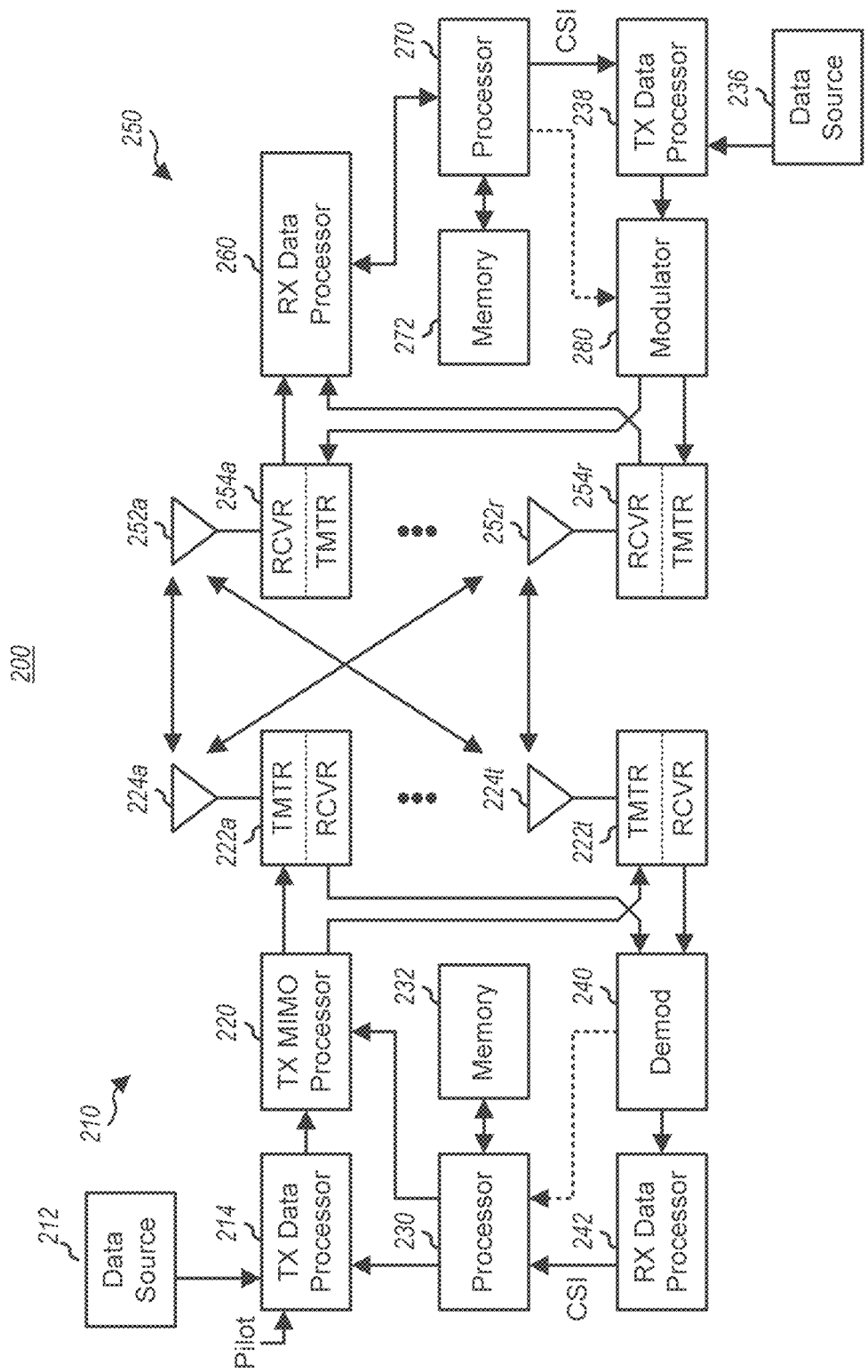
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
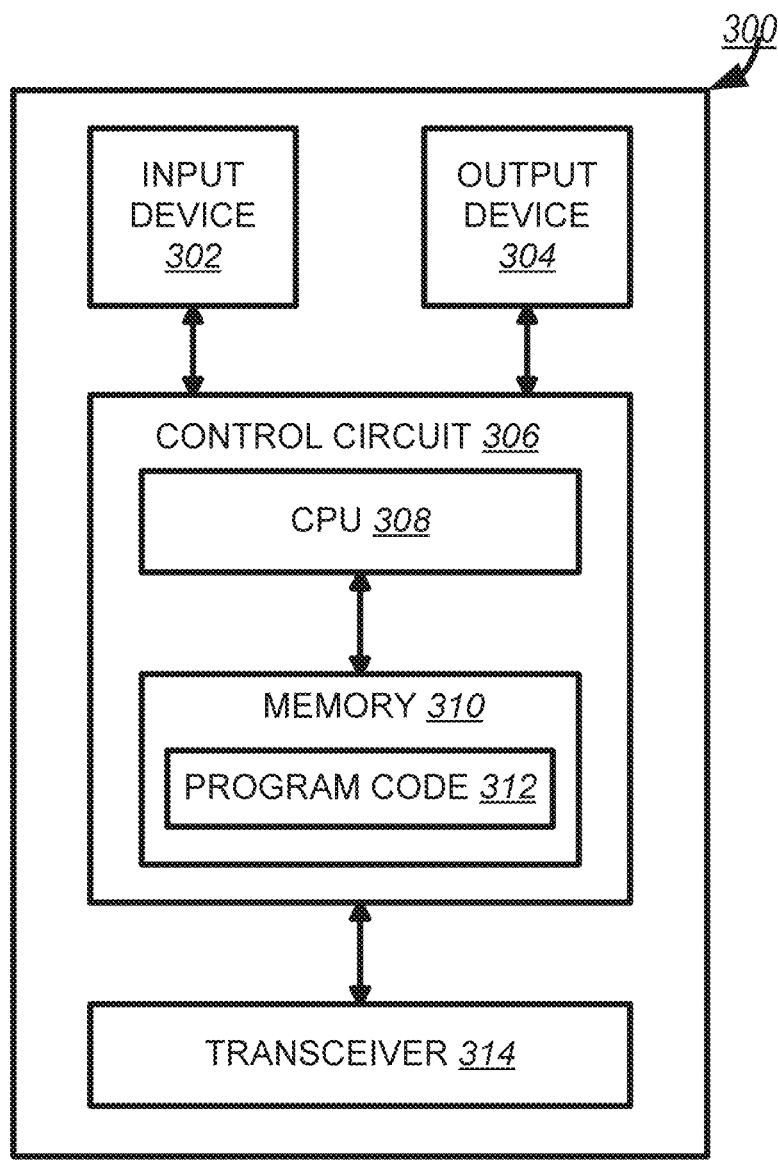
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
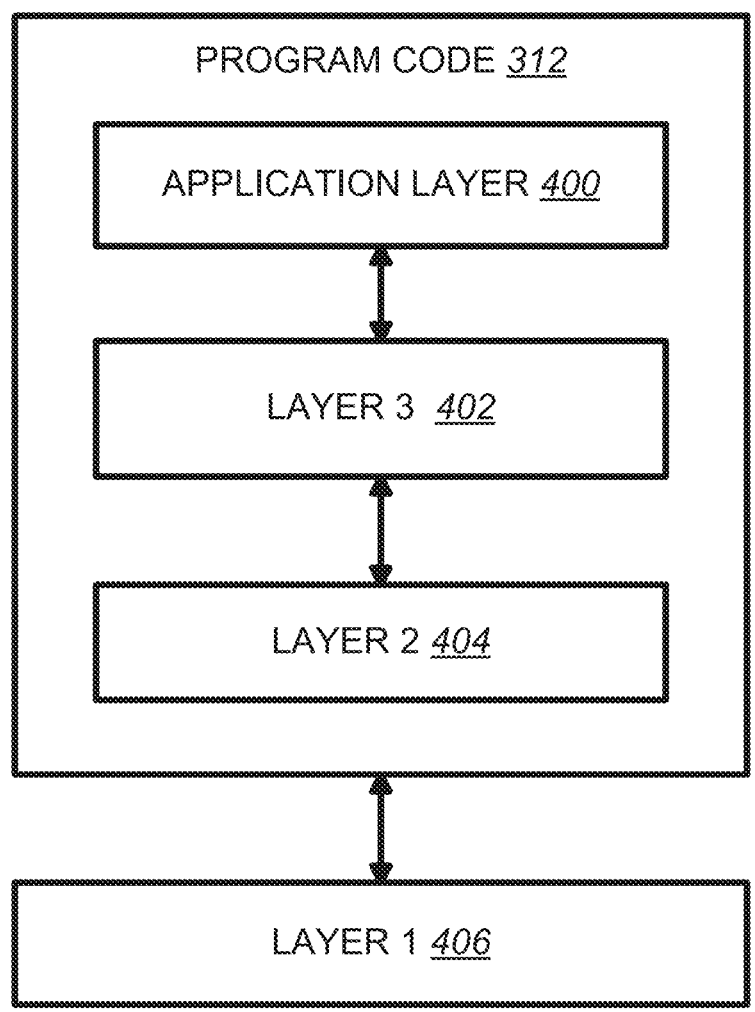
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.214 specifies Physical sidelink shared channel related procedure in NR. For acquiring sidelink resources, 3GPP TS 38.214 specifies sidelink resource allocation mode 1 and sidelink resource allocation mode 2 as follows:

8 Physical Sidelink Shared Channel Related Procedures

A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2.

In the frequency domain, a sidelink resource pool consists of numSubchannel contiguous sub-channels. A sub-channel consists of subchannelsize contiguous PRBs, where numSubchannel and subchannelsize are higher layer parameters.

The set of slots that may belong to a sidelink resource pool is denoted by $(t_0^{SL}, t_1^{SL}, \ldots, t_{T_{max}-1}^{SL})$ where $0 \leq t_i^{SL} < 10240 \times 2^\mu$, $0 \leq i < T_{max}$;

the slot index is relative to slot #0 of the radio frame corresponding to SFN 0 of the serving cell or DFN 0,
the set includes all the slots except the following slots,
  $N_{S\_SSB}$ slots in which S-SS/PSBCH block (S-SSB) is configured,
  $N_{nonSL}$ slots in each of which at least one of Y-th, (Y+1)-th, ..., (Y+X−1)-th OFDM symbols are not semi-statically configured as UL as per the higher layer parameter TDD-UL-DL-ConfigCommon, where Y and X are set by the higher layer parameters sl-StartSymbol and sl-LengthSymbols, respectively.
  The reserved slots which are determined by the following steps.
    1) the remaining slots excluding $N_{S\_SSB}$ slots and $N_{nonSL}$ slots from the set of all the $T_{max}$ slots are denoted by $(l_0, l_1, \ldots, l_{(10240 \times 2^\mu - N_{S_{SSB}} - N_{nonSL} - 1)})$ arranged in increasing order of slot index.
    2) a slot $l_r$ $(0 \leq r < 10240 \times 2^\mu - N_{S_{SSB}} - N_{nonSL})$ belongs to the reserved slots if $$r = \left\lfloor \frac{m \cdot (10240 \times 2^\mu - N_{S_{SSB}} - N_{nonSL})}{N_{reserved}} \right\rfloor,$$

here m=0, 1, ..., $N_{reserved}-1$ and $N_{reserved}=(10240 \times 2^\mu - N_{S_{SSB}} - N_{nonSL}) \bmod L_{bitmap}$ where $L_{bitmap}$ denotes the length of bitmap configured by higher layers.

The slots in the set are arranged in increasing order of slot index.

The UE determines the set of slots assigned to a sidelink resource pool as follows:

a bitmap $(b_0, b_1, \ldots, b_{L_{bitmap}-1})$ associated with the resource pool is used where $L_{bitmap}$ the length of the bitmap is configured by higher layers.

a slot $t_k^{SL}$ $(0 \leq k < 10240 \times 2^\mu - N_{S_{SSB}} - N_{nonSL} - N_{reserved})$ belongs to the slot pool if $b_{k'}=1$ where k'=k mod $L_{bitmap}$.

The UE determines the set of resource blocks assigned to a sidelink resource pool as follows:

The resource block pool consists of $N_{PRB}$ PRBs.
The sub-channel m for m=0,1, ..., numSubchannel−1 consists of a set of $n_{subCHsize}$ contiguous resource blocks with the physical resource block number $n_{PRB}=n_{subCHRBstart}+m \cdot n_{subCHsize}+j$ for j=0, 1, ..., $n_{subCHsize}-1$, where $n_{subCHRBstart}$ and $n_{subCHsize}$ are given by higher layer parameters sl_StartRB-Subchannel and sl-SubchannelSize, respectively A UE is not expected to use the last $N_{PRB}$ mod $n_{subCHsize}$ PRBs in the resource pool.

8.1 UE Procedure for Transmitting the Physical Sidelink Shared Channel

Each PSSCH transmission is associated with an PSCCH transmission.

That PSCCH transmission carries the $1^{st}$ stage of the SCI associated with the PSSCH transmission; the $2^{nd}$ stage of the associated SCI is carried within the resource of the PSSCH. If the UE transmits SCI format 1-A on PSCCH according to a PSCCH resource configuration in slot n and PSCCH resource m, then for the associated PSSCH transmission in the same slot
  one transport block is transmitted with up to two layers;
  The number of layers (u) is determined according to the "Number of DMRS port" field in the SCI
  The set of consecutive symbols within the slot for transmission of the PSSCH is determined according to clause 8.1.2.1;
  The set of contiguous resource blocks for transmission of the PSSCH is determined according to clause 8.1.2.2;

8.1.1 Transmission Schemes

Only one transmission scheme is defined for the PSSCH and is used for all PSSCH transmissions.

PSSCH transmission is performed with up to two antenna ports, with antenna ports 1000-1001 as defined in clause 8.2.4 of [4, TS 38.211].

8.1.2 Resource Allocation

In sidelink resource allocation mode 1:
  for PSSCH and PSCCH transmission, dynamic grant, configured grant type 1 and configured grant type 2 are supported. The configured grant Type 2 sidelink transmission is semi-persistently scheduled by a SL grant in a valid activation DCI according to Clause 10.3 of [6, TS 38.213].

8.1.2.1 Resource Allocation in Time Domain

The UE shall transmit the PSSCH in the same slot as the associated PSCCH.

The minimum resource allocation unit in the time domain is a slot.

The UE shall transmit the PSSCH in consecutive symbols within the slot, subject to the following restrictions:
  The UE shall not transmit PSSCH in symbols which are not configured for sidelink. A symbol is configured for sidelink, according to higher layer parameters startSLsymbols and lengthSLsymbols, where startSLsymbols is the symbol index of the first symbol of lengthSLsymbols consecutive symbols configured for sidelink.
  Within the slot, PSSCH resource allocation starts at symbol startSLsymbols+1.

The UE shall not transmit PSSCH in symbols which are configured for use by PSFCH, if PSFCH is configured in this slot.

The UE shall not transmit PSSCH in the last symbol configured for sidelink.

The UE shall not transmit PSSCH in the symbol immediately preceding the symbols which are configured for use by PSFCH, if PSFCH is configured in this slot.

In sidelink resource allocation mode 1:
  For sidelink dynamic grant, the PSSCH transmission is scheduled by a DCI format 3_0.
  For sidelink configured grant type 2, the configured grant is activated by a DCI format 3_0.
  For sidelink dynamic grant and sidelink configured grant type 2:
    The "Time gap" field value m of the DCI format 30 provides an index m+1 into a slot offset table. That table is given by higher layer parameter timeGapFirstSidelinkTransmission and the table value at index m+1 will be referred to as slot offset $K_{SL}$.
    The slot of the first sidelink transmission scheduled by the DCI is the first SL slot of the corresponding resource pool that starts not earlier than $T_{DL}-T_{TA}/2+K_{SL} \times T_{slot}$ where $T_{DL}$ is starting time of the downlink slot carrying the corresponding DCI, $T_{TA}$ is the timing advance value and $K_{SL}$ is the slot offset between the slot DCI and the first sidelink transmission scheduled by DCI, $T_c$ is as defined in 38.211, and $T_{slot}$ is the SL slot duration.
  For sidelink configured grant type 1:
    The slot of the first sidelink transmissions follows the higher layer configuration according to [10, TS 38.321].

8.1.2.2 Resource Allocation in Frequency Domain

The resource allocation unit in the frequency domain is the sub-channel.

The sub-channel assignment for sidelink transmission is determined using the "Frequency resource assignment" field in the associated SC.

The lowest sub-channel for sidelink transmission is the sub-channel on which the lowest PRB of the associated PSCCH is transmitted.

If a PSSCH scheduled by a PSCCH would overlap with resources containing the PSCCH, the resources corresponding to a union of the PSCCH that scheduled the PSSCH and associated PSCCH DM-RS are not available for the PSSCH.

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:
  the resource pool from which the resources are to be reported;
  L1 priority, $prio_{TX}$;
  the remaining packet delay budget;
  the number of sub-channels to be used for the PSSCH/PSCCH transmission in a slot, $L_{subCH}$;
  optionally, the resource reservation interval, $P_{rsvp\_Tx}$, in units of ms.
  if the higher layer requests the UE to determine a subset of resources from which the higher layer will select resources for PSSCH/PSCCH transmission as part of re-evaluation or pre-emption procedure, the higher layer provides a set of resources ($r_0, r_1, r_2, \ldots$) which may be subject to re-evaluation and a set of resources ($r'_0, r'_1, r'_2, \ldots$) which may be subject to pre-emption.
  it is up to UE implementation to determine the subset of resources as requested by higher layers before or after the slot $r''_i-T_3$, where $r''_i$ is the slot with the smallest slot index among ($r_0, r_1, r_2, \ldots$) and ($r'_0, r'_1, r'_2, \ldots$), and $T_3$ is equal to $T_{proc,1}^{SL}$, where $T_{proc,1}^{SL}$ is defined in slots in Table 8.1.4-2 where $\mu_{SL}$ is the SCS configuration of the SL BWP.

The following higher layer parameters affect this procedure:
  t2min_SelectionWindow: internal parameter $T_{2min}$ is set to the corresponding value from higher layer parameter t2min_SelectionWindow for the given value of $prio_{TX}$.
  SL-ThresRSRP_pi_pj: this higher layer parameter provides an RSRP threshold for each combination ($p_i, p_j$), where $p_i$ is the value of the priority field in a received SCI format 1-A and $p_j$ is the priority of the transmission of the UE selecting resources; for a given invocation of this procedure, $p_j = prio_{TX}$.
  RSforSensing selects if the UE uses the PSSCH-RSRP or PSCCH-RSRP measurement, as defined in clause 8.4.2.1.
  sl-ResourceReservePeriodList
  t0_SensingWindow: internal parameter $T_0$ is defined as the number of slots corresponding to t0_SensingWindow ms.
  sl-xPercentage: internal parameter X for a given $prio_{TX}$ is defined as sl-xPercentage($prio_{TX}$) converted from percentage to ratio
  p_preemption: internal parameter $prio_{pre}$ is set to the higher layer provided parameter p_preemption The resource reservation interval, $P_{rsvp\_TX}$, if provided, is converted from units of ms to units of logical slots, resulting in $P'_{rsvp\_TX}$ according to clause 8.1.7.

Notation:

($t_0^{SL}, t_1^{SL}, t_2^{SL}, \ldots$) denotes the set of slots which can belong to a sidelink resource pool and is defined in Clause 8.

The following steps are used:
  1) A candidate single-slot resource for transmission $R_{x,y}$ is defined as a set of $L_{subCH}$ contiguous sub-channels with sub-channel x+j in slot $t_y^{SL}$ where $j=0, \ldots, L_{subCH}-1$. The UE shall assume that any set of $L_{subCH}$ contiguous sub-channels included in the corresponding resource pool within the time interval [n+$T_1$,n+$T_2$] correspond to one candidate single-slot resource, where
    selection of $T_1$ is up to UE implementation under $0 \leq T_1 \leq T_{proc,1}^{SL}$, where $T_{proc,1}^{SL}$ is defined in slots in Table 8.1.4-2 where $\mu_{SL}$ is the SCS configuration of the SL BWP;
    if $T_{2min}$ is shorter than the remaining packet delay budget (in slots) then $T_2$ is up to UE implementation subject to $T_{2min} \leq T_2 \leq$ remaining packet budget (in slots); otherwise $T_2$ is set to the remaining packet delay budget (in slots).
    The total number of candidate single-slot resources is denoted by $M_{total}$.
  2) The sensing window is defined by the range of slots [n−$T_0$,n−$T_{proc,0}^{SL}$) where $T_0$ is defined above and $T_{proc,0}^{SL}$ is defined in slots in Table 8.1.4-1 where $\mu_{SL}$ is the SCS configuration of the SL BWP. The UE shall monitor slots which can belong to a sidelink resource pool within the sensing window except for those in which its own transmissions occur. The UE shall perform the behaviour in the following steps based on PSCCH decoded and RSRP measured in these slots.

3) The internal parameter Th($p_i$) is set to the corresponding value from higher layer parameter SL-ThresRSRP_pi_pj for $p_j$ equal to the given value of prio$_{TX}$ and each priority value $p_i$.

4) The set $S_A$ is initialized to the set of all the candidate single-slot resources.

5) The UE shall exclude any candidate single-slot resource $R_{x,y}$ from the set $S_A$ if it meets all the following conditions:

the UE has not monitored slot $t_m^{SL}$ in Step 2.

for any periodicity value allowed by the higher layer parameter sl-ResourceReservePeriodList and a hypothetical SCI format 1-A received in slot $t_m^{SL}$ with "Resource reservation period" field set to that periodicity value and indicating all subchannels of the resource pool in this slot, condition c in step 6 would be met.

6) The UE shall exclude any candidate single-slot resource $R_{x,y}$ from the set $S_A$ if it meets all the following conditions:

a) the UE receives an SCI format 1-A in slot $t_m^{SL}$, and "Resource reservation period" field, if present, and "Priority" field in the received SCI format 1-A indicate the values $P_{rsvp\_RX}$ and prio$_{RX}$, respectively according to Clause 16.4 in [6, TS 38.213];

b) the RSRP measurement performed, according to clause 8.4.2.1 for the received SCI format 1-A, is higher than Th(prio$_{RX}$);

c) the SCI format received in slot $t_m^{SL}$ or the same SCI format which, if and only if the "Resource reservation period" field is present in the received SCI format 1-A, is assumed to be received in slot(s) $t_{m+q \times P'_{rsvp\_TX}}^{SL}$ determines according to clause 8.1.5 the set of resource blocks and slots which overlaps with $R_{x,y+j \times P'_{rsvp\_TX}}$ for q=1, 2, . . . , Q and j=0, 1, . . . , $C_{reset}$−1. Here, $P'_{rsvp\_RX}$ is $P_{rsvp\_RX}$ converted to units of logical slots according to clause 8.1.7, $$Q = \left\lceil \frac{T_{scal}}{P_{rsvp\_Rx}} \right\rceil$$

if $P_{rsvp\_RX} < T_{scal}$ and n'−m≤$P'_{rsvp\_RX}$, where $t_{n'}^{SL}$=n if slot n belongs to the set ($t_0^{SL}, t_1^{SL}, \ldots, t_{T_{max}}^{SL}$), otherwise slot $t_{n'}^{SL}$ is the first slot after slot n belonging to the set ($t_0^{SL}, t_1^{SL}, \ldots, t_{T_{max}}^{SL}$); otherwise Q=1. $T_{scal}$ is set to selection window size $T_2$ converted to units of ms.

7) If the number of candidate single-slot resources remaining in the set $S_A$ is smaller than X·$M_{total}$, then Th($p_i$) is increased by 3 dB for each priority value Th($p_i$) and the procedure continues with step 4.

The UE shall report set $S_A$ to higher layers.

If a resource $r_i$ from the set ($r_0, r_1, r_2, \ldots$) is not a member of $S_A$, then the UE shall report re-evaluation of the resource $r_i$ to higher layers.

If a resource $r'_i$ from the set ($r'_0, r'_1, r'_2, \ldots$) is not a member of $S_A$ due to exclusion in step 6 above by comparison with the RSRP measurement for the received SCI format 1-A with an associated priority prio$_{RX}$, and prio$_{RX}$<prio$_{pre}$ and prio$_{TX}$>prio$_{RX}$, then the UE shall report pre-emption of the resource $r'_i$ to higher layers.

[Table 8.1.4-1 of 3GPP TS 38.214 V16.2.0, Entitled "$T_{proc,0}^{SL}$ Depending on Sub-Carrier Spacing", is Reproduced as FIG. 5]

[Table 8.1.4-2 of 3GPP TS 38.214 V16.2.0, Entitled "$T_{proc,1}^{SL}$ Depending on Sub-Carrier Spacing", is Reproduced as FIG. 6]

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields "Frequency resource assignment", "Time resource assignment" of the associated SCI format 1-A as described below.

8.3 UE Procedure for Receiving the Physical Sidelink Shared Channel

For sidelink resource allocation mode 1, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

For sidelink resource allocation mode 2, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

A UE is required to decode neither the corresponding SCI formats 2-A and 2-B nor the PSSCH associated with an SCI format 1-A if the SCI format 1-A indicates an MCS table that the UE does not support.

3GPP TS 38.212 V16.2.0 specifies sidelink control information and Downlink Control Information (DCI) as Sidelink (SL) grant in New Radio (NR) as follows:

7.3.1 DCI Formats 7.3.1.4 DCI Formats for Scheduling of Sidelink 7.3.1.4.1 Format 3_0

DCI format 3_0 is used for scheduling of NR PSCCH and NR PSSCH in one cell.

The following information is transmitted by means of the DCI format 3_0 with CRC scrambled by SL-RNTI or SL-CS-RNTI:

Resource pool index −⌈$\log_2 I$⌉ bits, where I is the number of resource pools for transmission configured by the higher layer parameter sl-TxPoolScheduling.

Time gap—3 bits determined by higher layer parameter sl-DCI-ToSL-Trans, as defined in clause 8.1.2.1 of [6, TS 38.214]

HARQ process number—⌈$\log_2 N_{process}$⌉ bits as defined in clause 16.4 of [5, TS 38.213]

New data indicator—1 bit as defined in clause 16.4 of [5, TS 38.213]

Lowest index of the subchannel allocation to the initial transmission −⌈$\log_2(N_{subChannel}^{SL})$⌉ bits as defined in clause 8.1.2.2 of [6, TS 38.214]

SCI format 1-A fields according to clause 8.3.1.1:
Frequency resource assignment.
Time resource assignment.
PSFCH-to-HARQ feedback timing indicator −⌈$\log_2 N_{fb\_timing}$⌉ bits, where $N_{fb\_timing}$ is the number of entries in the higher layer parameter sl-PSFCH-ToPUCCH, as defined in clause 16.5 of [5, TS 38.213]

PUCCH resource indicator—3 bits as defined in clause 16.5 of [5, TS 38.213].

Configuration index—0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 With CRC scrambled by SL-CS-RNTI, this field is reserved for DCI format 3_0 with CRC scrambled by SL-RNTI.

Counter sidelink assignment index—2 bits 2 bits as defined in clause 16.5.2 of [5, TS 38.213] if the UE is configured with pdsch-HARQ-ACK-Codebook=dynamic 2 bits as defined in clause 16.5.1 of [5, TS 38.213] if the UE is configured with pdsch-HARQ-ACK-Codebook=semi-static Padding bits, if required If multiple transmit resource pools are provided in sl-TxPoolScheduling, zeros shall be appended to the DCI format 3_0 until the payload size is equal to the size of a DCI format 3_0 given by a configuration of the transmit resource pool resulting in the largest number of information bits for DCI format 3_0.

8.3 Sidelink Control Information on PSCCH

SCI carried on PSCCH is a $1^{st}$-stage SCI, which transports sidelink scheduling information.

8.3.1 $1^{St}$-Stage SCI Formats

The fields defined in each of the $1^{st}$-stage SCI formats below are mapped to the information bits $a_0$ to $a_{A-1}$ as follows:

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

8.3.1.1 SCI Format 1-A

SCI format 1-A is used for the scheduling of PSSCH and $2^{nd}$-stage-SCI on PSSCH The following information is transmitted by means of the SCI format 1-A:

Priority—3 bits as defined in clause 5.4.3.3 of [12, TS 23.287].

Frequency resource assignment $$-\left\lceil \log_2 \left( \frac{N_{subChannel}^{SL}(N_{subChannel}^{SL}+1)}{2} \right) \right\rceil$$

bits when the value of the higher layer parameter sl-MaxNumPerReserve is configured to 2; otherwise $$\left\lceil \log_2 \left( \frac{N_{subChannel}^{SL}(N_{subChannel}^{SL}+1)(2N_{subChannel}^{SL}+1)}{6} \right) \right\rceil$$

bits when the value of the higher layer parameter sl-MaxNumPerReserve is configured to 3, as defined in clause 8.1.2.2 of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].

Resource reservation period –$\lceil \log_2 N_{rsv\_period} \rceil$ bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured; 0 bit otherwise.

DMRS pattern—$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList; 0 bit if sl-PSSCH-DMRS-TimePatternList is not configured.

$2^{nd}$-stage SCI format—2 bits as defined in Table 8.3.1.1-1.

Beta_offset indicator—2 bits as provided by higher layer parameter sl-BetaOffsets2ndSCI and Table 8.3.1.1-2.

Number of DMRS port—1 bit as defined in Table 8.3.1.1-3.

Modulation and coding scheme—5 bits as defined in clause 8.1.3 of [6, TS 38.214].

Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.

PSFCH overhead indication—1 bit as defined clause 8.1.3.2 of [6, TS 38.214] if higher layer parameter sl-PSFCH-Period=2 or 4; 0 bit otherwise.

Reserved—a number of bits as determined by higher layer parameter sl-NumReservedBits, with value set to zero.

[Table 8.3.1.1-1 of 3GPP TS 38.212 V16.2.0, Entitled "$2^{nd}$-Stage SCI Formats", is Reproduced as FIG. 7]

[Table 8.3.1.1-2 of 3GPP TS 38.212 V16.2.0, Entitled "Mapping of Beta_Offset Indicator Values to Indexes in Table 9.3-2 of [5, TS38.213]", is Reproduced as FIG. 8]

[Table 8.3.1.1-3 of 3GPP TS 38.212 V16.2.0, Entitled "Number of DMRS Port(s)", is Reproduced as FIG. 9]

8.4 Sidelink Control Information on PSSCH

SCI carried on PSSCH is a $2^{nd}$-stage SCI, which transports sidelink scheduling information.

8.4.1 $2^{nd}$-Stage SCI Formats

The fields defined in each of the $2^{nd}$-stage SCI formats below are mapped to the information bits $a_0$ to $a_{A-1}$ as follows:

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

8.4.1.1 SCI Format 2-A

SCI format 2-A is used for the decoding of PSSCH, with HARQ operation when HARQ-ACK information includes ACK or NACK, or when there is no feedback of HARQ-ACK information.

The following information is transmitted by means of the SCI format 2-A:

HARQ process number—$\lceil \log_2 N_{process} \rceil$ bits as defined in clause 16.4 of [5, TS 38.213].

New data indicator—1 bit as defined in clause 16.4 of [5, TS 38.213].

Redundancy version—2 bits as defined in clause 16.4 of [6, TS 38.214].

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1.

CSI request—1 bit as defined in clause 8.2.1 of [6, TS 38.214].

[Table 8.4.1.1-1 of 3GPP TS 38.212 V16.2.0, Entitled "Cast Type Indicator", is Reproduced as FIG. 10]

8.4.1.2 SCI Format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—$\lceil \log_2 N_{process} \rceil$ bits as defined in clause 16.4 of [5, TS 38.213].

New data indicator—1 bit as defined in clause 16.4 of [5, TS 38.213].

Redundancy version—2 bits as defined in clause 16.4 of [6, TS 38.214].

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Zone ID—12 bits as defined in clause 5.8.1.1 of [9, TS 38.331].

Communication range requirement—4 bits as defined in [9, TS 38.331]

8.4.5 Multiplexing of Coded $2^{nd}$-Stage SCI Bits to PSSCH

The coded $2^{nd}$-stage SCI bits are multiplexed onto PSSCH according to the procedures in Clause 8.2.1.

3GPP RP-201385 specifies the Justification and objective of work item on NR sidelink enhancement as follows:

3 Justification

3GPP has been developing standards for sidelink as a tool for UE to UE direct communication required in various use cases since LTE. The first standard for NR sidelink is to be completed in Rel-16 by the work item "5G V2X with NR sidelink" where solutions including NR sidelink are being specified mainly for vehicle-to-everything (V2X) while they can also be used for public safety when the service requirement can be met.

Meanwhile, the necessity of NR sidelink enhancement has been identified. For V2X and public safety, the service requirements and operation scenarios are not fully supported in Rel-16 due to the time limitation, and SA works are ongoing on some enhancement in Rel-17 such as architecture enhancements for 3GPP support of advanced V2X services—Phase 2 (FS_eV2XARC_Ph2) and System enhancement for Proximity based Services in 5GS (FS_5G_ProSe). In addition, other commercial use cases related to NR sidelink are being considered in SA WGs via several work/study items such as Network Controlled Interactive Service (NCIS), Gap Analysis for Railways (MONASTERYEND), Enhanced Relays for Energy eFficiency and Extensive Coverage (REFEC), Audio-Visual Service Production (AVPROD). In order to provide a wider coverage of NR sidelink for these use cases and be able to provide the radio solutions in accordance with the progress in SA WGs, it is necessary to specify enhancements to NR sidelink in TSG RAN.

TSG RAN started discussions in RAN #84 to identify the detailed motivations and work areas for NR sidelink enhancements in Rel-17. Based on the latest summary in RP-192745, significant interest has been observed for the several motivations including the following:

Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

Enhanced reliability and reduced latency allow the support of URLLC-type sidelink use cases in wider operation scenarios. The system level reliability and latency performance of sidelink is affected by the communication conditions such as the wireless channel status and the offered load, and Rel-16 NR sidelink is expected to have limitation in achieving high reliability and low latency in some conditions, e.g., when the channel is relatively busy. Solutions that can enhance reliability and reduce latency are required in order to keep providing the use cases requiring low latency and high reliability under such communication conditions.

4 Objective 4.1 Objective of SI or Core Part WI or Testing Part WI

The objective of this work item is to specify radio solutions that can enhance NR sidelink for the V2X, public safety and commercial use cases.

1. Sidelink evaluation methodology update: Define evaluation assumption and performance metric for power saving by reusing TR 36.843 and/or TR 38.840 (to be completed by RAN #89) [RAN1]

Note: TR 37.885 is reused for the other evaluation assumption and performance metric. Vehicle dropping model B and antenna option 2 shall be a more realistic baseline for highway and urban grid scenarios.

2. Resource allocation enhancement:

Specify resource allocation to reduce power consumption of the UEs [RAN1, RAN2]

Baseline is to introduce the principle of Rel-14 LTE sidelink random resource selection and partial sensing to Rel-16 NR sidelink resource allocation mode 2.

Note: Taking Rel-14 as the baseline does not preclude introducing a new solution to reduce power consumption for the cases where the baseline cannot work properly.

Study the feasibility and benefit of the enhancement(s) in mode 2 for enhanced reliability and reduced latency in consideration of both PRR and PIR defined in TR37.885 (by RAN #91), and specify the identified solution if deemed feasible and beneficial [RAN1, RAN2]

Inter-UE coordination with the following until RAN #90. A set of resources is determined at UE-A. This set is sent to UE-B in mode 2, and UE-B takes this into account in the resource selection for its own transmission.

Note: The study scope after RAN #90 is to be decided in RAN #90.

Note: The solution should be able to operate in-coverage, partial coverage, and out-of-coverage and to address consecutive packet loss in all coverage scenarios.

Note: RAN2 work will start after [RAN #89].

3. Sidelink DRX for broadcast, groupcast, and unicast [RAN2]

Define on- and off-durations in sidelink and specify the corresponding UE procedure Specify mechanism aiming to align sidelink DRX wake-up time among the UEs communicating with each other Specify mechanism aiming to align sidelink DRX wake-up time with Uu DRX wake-up time in an in-coverage UE Enhancements introduced in Rel-17 should be based on the functionalities specified in Rel-16, and Rel-17 sidelink should be able to coexist with Rel-16 sidelink in the same resource pool. This does not preclude the possibility of operating Rel-17 sidelink in a dedicated resource pool.

The solutions should cover both the operating scenario where the carrier(s) is/are dedicated to ITS and the operating scenario where the carrier(s) is/are licensed spectrum and also used for NR Uu/LTE Uu operation.

The solutions should support the network control of NR sidelink as in Rel-16, i.e., NR Uu controls NR sidelink using Layer 1 and Layer 2 signalling and LTE Uu controls NR sidelink using Layer 2 signalling.

In ITS carriers, it is assumed that any co-channel coexistence requirements and mechanisms of NR sidelink with non-3GPP technologies will not be defined by 3GPP.

In the RAN1 #102-e meeting, RAN1 has some discussion on SL mode enhancement as discussed in the "FL summary #1 for AI 8.11.2.2 Feasibility and benefits for mode 2 enhancements" as follows:

3. $2^{nd}$ Draft Proposals

Proposal 1 for the conclusion:
When a set of resources determined at UE-A is sent to UE-B in mode 2 and UE-B takes this into account in the resource selection for its own transmission,
for the definition of "a set of resources", at least followings can be considered:
Option 1) Resource set which is suggested by UE-B's transmission
Option 2) Resource set which is not suggested to be used by UE-B's transmission
Option 3) Resource set which is suggested for UE-A's reception
Option 4) Resource set which is not suggested for UE-A's reception
FFS details on how UE-A determines "a set of resources"
FFS details on signaling of "a set of resources"
FFS how UE-B takes "a set of resources" into account in the resource selection for its own transmission
FFS whether/how to support other assistance information (e.g., rationale for resource set not suggested by UE-A)
FFS which cast type is considered for "inter-UE coordination"
Note: Other definition of "a set of resources" is not precluded.
Note: The above candidates are subject to down-selection (including whether $3^{rd}$ and $4^{th}$ options need to be specified separately from $1^{st}$ and $2^{nd}$ options).

Proposal 2 for the conclusion:
When a set of resources determined at UE-A is sent to UE-B in mode 2 and UE-B takes this into account in the resource selection for its own transmission,
for the condition when UE-A sends "a set of resources" to UE-B, at least followings can be considered:
Option 1) Explicit triggering or request signaling based transmission
Option 2) Transmission when other pre-defined or (pre)configured condition(s) is satisfied (i.e., not based on explicit triggering or request signaling)
FFS details on UE-A behavior of transmitting "a set of resources" when the above option is satisfied
FFS details of explicit triggering/request signaling in $1^{st}$ option
FFS details of condition(s) in $2^{nd}$ option
FFS whether/how to support a combination of above options
FFS which cast type is considered for "inter-UE coordination"
Note: Other condition when UE-A sends "a set of resources" to UE-B is not precluded.
Note: The above candidates are subject to down-selection.

In the RAN1 #94 meeting, RAN1 has some agreements about NR V2X mode 2 as discussed in 3GPP R1-1810051 as follows:

Agreements:
At least two sidelink resource allocation modes are defined for NR-V2X sidelink communication
Mode 1: Base station schedules sidelink resource(s) to be used by UE for sidelink transmission(s)
Mode 2: UE determines (i.e. base station does not schedule) sidelink transmission resource(s) within sidelink resources configured by base station/network or pre-configured sidelink resources In the RAN1 #98 meeting, RAN1 has some agreements about NR V2X mode 2 as discussed in 3GPP R1-1909942 as follows:

Agreements:
In Mode-2, SCI payload indicates sub-channel(s) and slot(s) used by a UE and/or reserved by a UE for PSSCH (re-)transmission(s)
SL minimum resource allocation unit is a slot
Working assumption:
An indication of a priority of a sidelink transmission is carried by SCI payload
This indication is used for sensing and resource (re) selection procedures
This priority is not necessarily the higher layer priority
Agreements:
The resource (re-)selection procedure includes the following steps
Step 1: Identification of candidate resources within the resource selection window
FFS details
Step 2: Resource selection for (re-)transmission(s) from the identified candidate resources
FFS details
Agreements:
In Step 1 of the resource (re-)selection procedure, a resource is not considered as a candidate resource if:
The resource is indicated in a received SCI and the associated L1 SL-RSRP measurement is above an SL-RSRP threshold
The SL-RSRP threshold is at least a function of the priority of the SL transmission indicated in the received SCI and the priority of the transmission for which resources are being selected by the UE
FFS details In the RAN1 #98bis meeting, RAN1 has some agreements about NR V2X mode as discussed in 3GPP R1-1913275 as follows:

Agreements:
  In Step 1, initial L1 SL-RSRP threshold for each combination of $p_i$ and $p_j$ is (pre-)configured, where $p_i$—priority indication associated with the resource indicated in SCI and $p_j$—priority of the transmission in the UE selecting resources
Agreements:
  In Step 1, when the ratio of identified candidate resources to the total number of resources in a resource selection window, is less than X %, all configured thresholds are increased by Y dB and the resource identification procedure is repeated
    FFS value(s)/configurability of X
      At least one value of X=20
    Y=3
  In the RAN1 #99 meeting, RAN1 has some agreements about NR V2X as discussed in 3GPP R1-2000151 as follows:
Agreements:
  On a per resource pool basis, when reservation of a sidelink resource for an initial transmission of a TB at least by an SCI associated with a different TB is enabled:
    A period is additionally signalled in SCI and the same reservation is applied with respect to resources indicated within $N_{MAX}$ within window W at subsequent periods
    A set of possible period values is the following: 0, [1:99], 100, 200, 300, 400, 500, 600, 700, 800, 900, 1000 ms
      <=4 bits are used in SCI to indicate a period
      An actual set of values is (pre-)configured
    Regarding the number of periods
      The number of remaining periodic reservations is not explicitly indicated in SCI
    (working assumption) Procedure of mapping of periodic semi-persistent resources into the resource selection window is reused from LTE
      By reusing TS 36.213, section 14.1.1.6, steps 5 and 6 of non-partial sensing, as applicable
    (working assumption) Procedure of triggering periodic semi-persistent resources reselection based on reselection counter and keep probability is reused from LTE
      By reusing definition and procedure of $C_{resel}$ defined in TS 36.213, as applicable
        Send an LS to RAN2 asking them to implement accordingly for TS38.321 based on TS36.321, R1-1913458—Sergey (Intel)
    Procedure of using sidelink RSSI for ranking of resources is not applied
R1-1913525
Agreements:
  $T2_{min}$ is (pre-)configured per priority indicated in SCI from the following set of values:
    $\{1, 5, 10, 20\}*2^\mu$, where $\mu=0, 1, 2, 3$ for SCS 15, 30, 60, 120 respectively
Agreements:
  In Step 2, randomized resource selection from the identified candidate resources in the selection window is supported
Agreements:
  T0 is (pre-)configured between: 1000+[100] ms and [100] ms Agreements:
  Support (pre-)configuration per resource pool between:
    L1 SL-RSRP measured on DMRS of PSSCH after decoding of associated 1$^{st}$ stage SCI, or
    L1 SL-RSRP measured on DMRS of PSCCH for 1$^{st}$ SCI after decoding of associated 1$^{st}$ stage SCI
    Note: L1 SL-RSRP is measured only based on one of the above, but not both
  In the RAN1 #100-e meeting, RAN1 has some agreements about NR V2X as discussed in 3GPP R1-2002747 as follows:
Agreements:
  In Step 2, a UE ensures a minimum time gap Z=a+b between any two selected resources of a TB where a HARQ feedback for the first of these resources is expected
    'a' is a time gap between the end of the last symbol of the PSSCH transmission of the first resource and the start of the first symbol of the corresponding PSFCH reception determined by resource pool configuration and higher layer parameters of MinTimeGapPSFCH and periodPSFCHresource
    'b' is a time required for PSFCH reception and processing plus sidelink retransmission preparation including multiplexing of necessary physical channels and any TX-RX/RX-TX switching time and is determined by UE implementation
Agreements:
  On a per resource pool basis, when reservation of a sidelink resource for an initial transmission of a TB at least by an SCI associated with a different TB is enabled:
    A set of possible period values additionally includes all integer values from 1 to 99 ms
  In the RAN1 #100b-e meeting, RAN1 has some agreements about NR V2X as discussed in 3GPP R1-2003251 as follows:
Agreements:
  The procedure to check whether a reserved resource to be signaled in slot 'm' should be re-selected due to pre-emption ~~is performed at the moment 'm-T3' as follows~~ :
    A regular Step 1 (as in 8.1.4 in 38.214) of the resource (re-)selection procedure is performed
    If the reserved resource is still in the identified candidate resource set after the Step 1 execution, then Step 2 for reselection of the reserved resource(s) is not triggered
    If the reserved resource is NOT in the identified candidate resource set after the Step 1 execution
      If the resource is excluded by comparison with the RSRP measurement for an SCI associated with a priority which can trigger pre-emption, then Step 2 for reselection of the reserved resource(s) is triggered
      If the resource is excluded by comparison with the RSRP measurement for an SCI associated with a priority which cannot trigger pre-emption, then Step 2 for reselection of the reserved resource(s) is not triggered
Agreements: Finalize the RRC parameter for pre-emption activation per resource pool by
  Disabled
  Enabled. Default is without a priority level (i.e., pre-emption is applicable to all levels).
    Can optionally configuring a priority level p_preemption {1 . . . 8} (the value range is a working assumption), and (as a working assumption regarding "<") if prioRX<p_preemption, and prioTX>prioRX, then pre-emption can be triggered
Note: In the inequalities it is assumed that the lowest priority value corresponds to the highest priority/importance traffic
prioRX is the priority associated with the resource indicated in SCI, as per 8.1.4 in 38.214
prioTX is L1 priority within a UE associated with the reserved resources, as per 8.1.4 in 38.214

Working Assumption:
The UE should/shall indicate ~~first in time~~ min(Nselected, N) first-in-time resources when setting the values of frequency resource assignment and time resource assignment in SCI format 0_1, where
Nselected is the number of resources selected by MAC within 32 slots (including the current one)
N is the maximum number of resources that can be signalled in one SCI In the RAN1 #101-e meeting, RAN1 has some agreements about NR V2X as discussed in 3GPP R1-2005255 as follows:

Agreements:
Tproc,0 is {1, 1, 2, [2 or 4]} physical slots for {15, 30, 60, 120} kHz sub-carrier spacing respectively Agreements:
Confirm that sensing window size parameter T0 is (pre-)configured between two values: 1100 ms and 100 ms Agreements
T3=Tproc,1, where the UE is only required to include sensing information from time earlier than 'm−T3−Tproc,0' for pre-emption and re-evaluation check at time 'm−T3'

Agreements:
A UE is expected to be (pre-)configured with a set sl-ResourceReservePeriod containing value of 0 ms Agreements:
A UE sets "Resource reservation period" in SCI 1-A to correspond to value of the period provided by higher layers from (pre-)configured set sl-ResourceReservePeriod
RAN1 assumes that at least in cases if higher layer decides not to keep the resource for the transmission in the next period or there is no associated period, then higher layer provides 0 ms periodicity In the RAN1 #102-e meeting, RAN1 has some agreements about NR V2X as discussed in the Chairman's Notes RAN1 #102-e final as follows:

Agreements:
Conclusion:
RAN1 expects the remaining PDB provided by higher layers is smaller than the resource reservation period (not including 0 ms) provided by higher layers
RAN1 has some agreements about NR V2X as discussed in 3GPP R1-2005255 as follows:

2 Scope of Mode 2 Resource Allocation Enhancements

In Rel-16 mode 2 resource allocation, the Tx UE determines sidelink transmission resources for a transmission pair by the sensing and reservation mechanism. The reserved resources indicated by other Tx UEs may be excluded by the Tx UE through SCI decoding and SL-RSRP measurement. By doing so, the Tx UE can avoid interference to the receiver of other transmission pairs, depending on priorities. However, the Rel-16 mode 2 resource allocation mechanism can experience at least the following issues, which are typical to distributed resource allocation algorithms: hidden nodes, exposed nodes, and the half duplex constraint.

Hidden Node Issue

The hidden node issue is illustrated in FIG. 1. Assume Tx UE B and Rx UE A is a transmission pair, and assume there is another Tx UE C close to Rx UE A and far away from Tx UE B. Then, it is possible that Tx UE B could not detect the SCI from Tx UE C, or the measured RSRP would be lower than the related threshold even though the SCI from Tx UE C is received. Hence, Tx UE B will not exclude the resource reserved by Tx UE C according to the Rel-16 mode 2 resource allocation mechanism. If Tx UE B selects the same resource with Tx UE C, then Rx UE A will probably be interfered by the transmission from Tx UE C.

In this case, Tx UE B is not aware of the interference of Tx UE C from its sensing information, and the reception may fail due to the interference from UE C to UE A.

Observation 1: Rel-16 mode 2 resource allocation mechanism can experience the hidden node issue, leading to reception failure due to interference from the hidden nodes.

Figure 11:
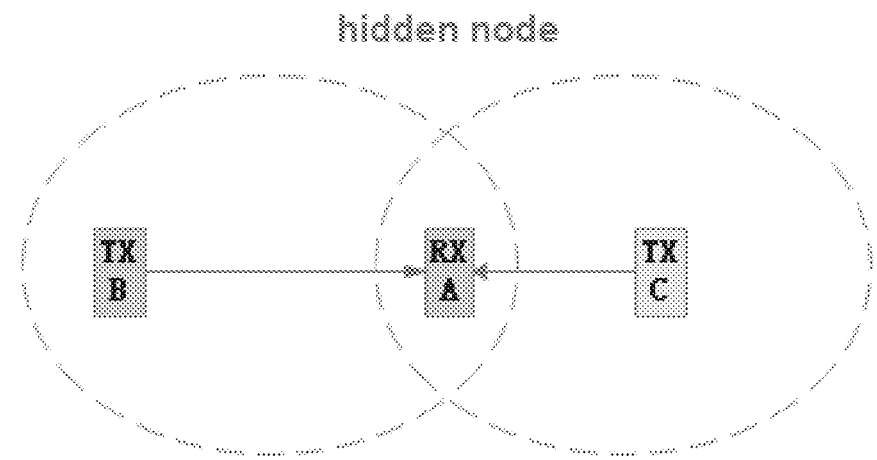
FIG. 11 is a reproduction of FIG. 1 of 3GPP R1-2005255.

[FIG. 1 of 3GPP R1-2005255, entitled "Illustration of hidden node: Transmission from TX UE C are hidden from TX UE B", is reproduced as FIG. 11]

Exposed Node Issue

The exposed node issue is illustrated in FIG. 2. Assume there are two transmission pairs, i.e., Tx UE B to Rx UE A and Tx UE C to Rx UE D, and assume UE B and UE C are close to each other. It is possible that UE B can decode the SCI from UE C and the measured RSRP would be higher than the threshold, then UE B will exclude the resource reserved by UE C according to the Rel-16 mode 2 resource allocation mechanism. However, since UE A is far from UE C, it is possible that UE A will not be interfered by UE C.

In this case, Tx UE B is aware of the interference of Tx UE C from its sensing information, and excludes the resource reserved by UE C. However, those resources actually can be used for transmission from UE B to UE A. So an excessive exclusion of resources happens in this case.

Observation 2: Rel-16 mode 2 resource allocation mechanism can experience the exposed node issue, which may cause excessive exclusion of resources.

Figure 12:
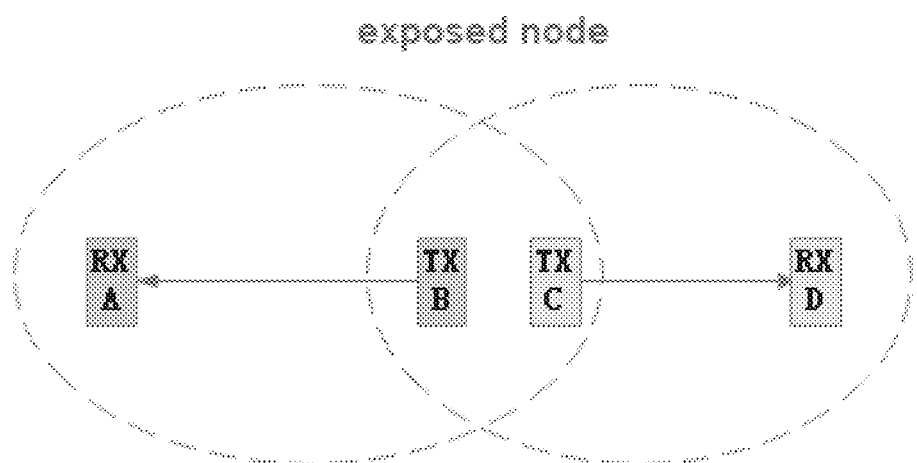
FIG. 12 is a reproduction of FIG. 2 of 3GPP R1-2005255.

[FIG. 2 of 3GPP R1-2005255, entitled "Illustration of exposed node: TX UE B is exposed to TX UE C's transmissions", is reproduced as FIG. 12]

Half-Duplex Issue

Due to the half-duplex assumption on sidelink, a UE cannot receive SCIs in the slots where it transmits. In Rel-16 mode 2 resource allocation, for the slots in which the Tx UE has not monitored, the worst case is assumed at the Tx UE that all the candidate resources associated with any periodicity value allowed by the higher layer are excluded. Hence, over exclusion may happen in some cases. Additionally, to find enough candidate resources, the UE may need to increase the RSRP threshold, which may lead to more interference to other UEs.

Observation 3: Rel-16 mode 2 resource allocation mechanism is subject to the half-duplex assumption, which can result in reservations being missed in a sensing UE's resource exclusion procedure.

According to the analysis above, the hidden node issue, exposed node issue, and half-duplex assumption may degrade the system performance in terms of PRR/PIR and resource utilization efficiency, and thus need to be addressed in Rel-17 mode 2 enhancement.

Proposal 1: The feasibility and benefits of mode 2 resource allocation enhancements are considered with regard to their ability to address the issues of hidden nodes, exposed nodes, and the half duplex constraint.

3 Potential Schemes for Mode 2 Enhancements

In general, there could be two potential schemes for mode 2 enhancements, i.e., mode 2b-like and mode 2d-like. The general framework, procedure, and potential open issues of these two schemes are discussed in the following.

3.1 General Framework

A generalized framework for mode 2b-like and mode 2d-like schemes is illustrated in FIG. 3, where Tx UE, Rx UE, and coordinating UE are considered.

Mode 2b-like schemes refers to those where a Tx UE may obtain coordinating information from some other UE (e.g., coordinating UE in FIG. 3), and the Tx UE takes this into account in the resource selection for its own transmission. In such schemes, the Rx UE or a UE close to the Rx UE may be selected as the coordinating UE. The Tx UE can determine its transmission resources based on the sensing and resource exclusion results from both the coordinating UE and the Tx UE itself.

Mode 2d-like schemes refers to those where one UE (e.g., coordinating UE in FIG. 3) schedules sidelink transmission resources for other Tx UEs. In mode 2d-like schemes, the Tx UE can benefit from power saving, or choose to not have the ability to perform sensing for device simplification. The Tx UE obtains transmission resource from a coordinating UE, and the transmission resource may be determined by the sensing results of the coordinating UE itself.

One key difference between mode 2b-like schemes and mode 2d-like schemes is the transmission resource of Tx UE is determined by Tx UE itself or other UEs. In mode 2b-like schemes, although the coordinating UE may give some coordinating information (e.g., recommended resources) to Tx UE, the transmission resource is finally determined by Tx UE itself. While in mode 2d-like schemes, the transmission resource is determined by the coordinating UE, and notified to the Tx UE though coordinating information.

In mode 2d-like schemes, due to the centralized scheduling by the coordinating UE, it is feasible to avoid resource collision completely within a coordinated group of UEs, thus addressing issues of hidden nodes, exposed nodes, and the half duplex constraint. For mode 2b-like schemes, under proper design on the trigger information and coordinating information, it is also possible to address these issues.

Figure 13:
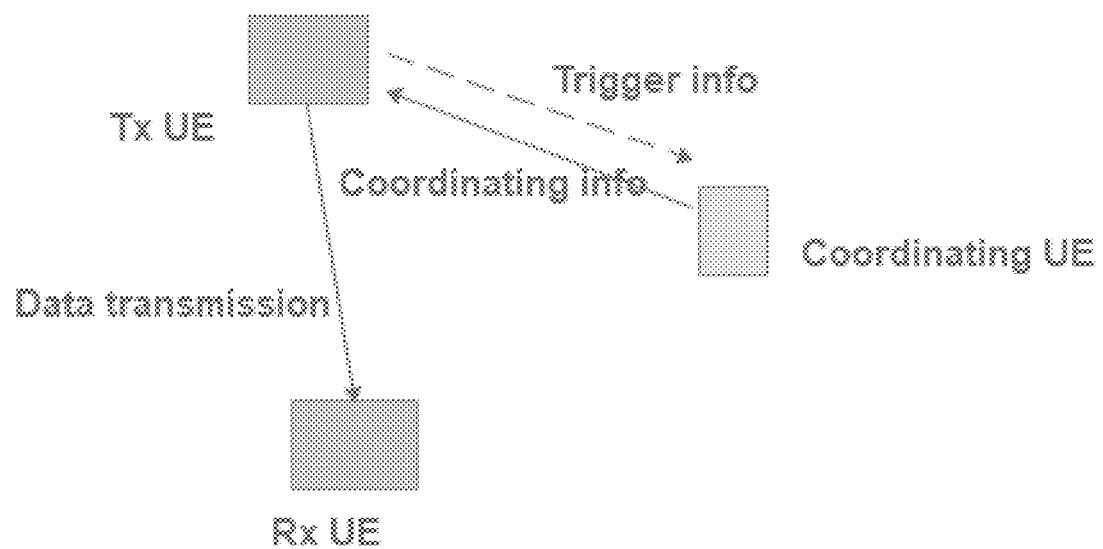
FIG. 13 is a reproduction of FIG. 3 of 3GPP R1-2005255.

[FIG. 3 of 3GPP R1-2005255, entitled "Framework for mode 2 resource allocation enhancement schemes", is reproduced as FIG. 13]

3.2 General Procedure

Proposal 2: Trigger-based and non-trigger based coordination procedures are considered for mode 2 enhancements in Rel-17.

3.3 Interference Control

In mode 2b-like schemes, each Tx UE selects resources on its own. Due to the nature of distributed resource allocation, it is infeasible to avoid resource collision completely even if the Tx UE may have some coordinating information.

While for mode 2d-like schemes, it is feasible to avoid resource collision completely within a coordinated group of UEs due to the centralized scheduling by the coordinating UE, which is similar to mode 1 resource allocation. So the resource utilization and interference level is more controllable in mode 2d-like schemes, thus achieving higher reliability, higher resource utilization efficiency, lower latency, etc.

Observation 4: Due to the nature of distributed resource allocation in mode 2b-like schemes, it is not feasible to avoid resource collision completely.

Observation 5: In a mode 2d-like schemes, it is feasible to avoid resource collision completely within a coordinated group of UEs due to the centralized scheduling by the coordinating UE. This has benefits for the system performance in terms of reliability, resource utilization efficiency, latency, etc.

3.4 Signaling Aspects

Observation 6: For mode 2b-like schemes to show a benefit, the content of coordinating information has to be large, to ensure feasible operation of the system such that the number of recommended resources is not too small, and to ensure the Tx UE is able to understand how the coordinating UE has performed its sensing.

Observation 7: For mode 2d-like schemes, the coordinating information need only include the final transmission resources, which are much fewer than the recommended resources in mode 2b-like schemes, thus having much smaller and more feasible signaling overhead.

Proposal 3: The feasibility of the signaling exchange overhead required in mode 2 enhancement in order to obtain a sufficient benefit needs to be analyzed.

3.5 Coordinating UE Identification

For both mode 2b-like and mode 2d-like schemes, a common issue is how to identify the coordinating UE (or UEs). For mode 2b-like schemes, the number of coordinating UEs may be difficult to determine. If the number of coordinating UEs is too large, the recommended resources from different coordinating UEs may be too diverse, and the large amount of trigger/coordinating information exchange would consume too much resource and cause high interference. However, if the number of coordinating UEs is too small, the Tx UE may not have enough information to perform a resource selection which is enhanced compared to the Rel-16 design. Moreover, for mode 2b-like schemes, since the Tx UE may determine its transmission resources based on the sensing and resource exclusion results from both the coordinating UEs and the Tx UE itself, the distance between the Tx UE and the coordinating UE is a critical issue. For example, when the coordinating UE is far from the Tx UE, it's highly possible that the sensing and resource exclusion results from the coordinating UE is totally different from the results obtained by the Tx UE itself. On the other hand, when the coordinating UE is close to the Tx UE, it's highly possible that the sensing and resource exclusion results from the coordinating UE is exactly the same with the results obtained by the Tx UE itself. Therefore, the feasibility and benefits of mode 2b-like schemes may highly depend on the distance between Tx UE and coordinating UE. And the improvement of performance may only be achieved in some limited scenarios. Moreover, due to the fast variation of channel condition, it is difficult to determine a suitable distance.

In contrast, in mode 2d-like schemes, only one coordinating UE is needed, and the coordinating UE can be the RSU unit or determined by the higher layer. So mode 2d-like schemes do not experience the "how to determine the number of coordinating UEs" issues. Moreover, in mode 2d-like schemes, only the coordinating UE needs to perform sensing. Due to the centralized scheduling by the coordinating UE, it is feasible to avoid resource collision completely within a coordinated group of UEs. So the distance between Tx UE and coordinating UE has little impact on the feasibility or benefits of mode 2d-like schemes.

Observation 8: In mode 2b-like schemes, the number of coordinating UEs, and the distance between Tx UE and coordinating UE are difficult to determine, and may highly impact the feasibility and benefits of such schemes.

Observation 9: Mode 2d-like schemes do not experience the "how to determine the number of coordinating UEs" issues, and the distance between Tx UE and coordinating UE has little impact on the feasibility and benefits of mode 2d-like schemes.

Proposal 4: Coordinating UE identification should be further considered for mode 2 enhancement in Rel-17.

3GPP TS 38.321 specifies sidelink-related procedure and behavior in MAC layer as follows:

5.22.1 SL-SCH Data Transmission 5.22.1.1 SL Grant Reception and SCI Transmission Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant.

If the MAC entity has been configured with Sidelink resource allocation mode 1 as indicated in TS 38.331 [5] or TS 36.331 [21], the MAC entity shall for each PDCCH occasion and for each grant received for this PDCCH occasion:
   1> if a sidelink grant has been received on the PDCCH for the MAC entity's SL-RNTI:
      2> if the NDI received on the PDCCH has been not toggled compared to the value in the previously received HARQ information for the HARQ Process ID:
         3> use the received sidelink grant to determine PSCCH duration(s) and PSSCH duration(s) for one or more retransmissions of a single MAC PDU for the corresponding Sidelink process according to clause 8.1.2 of TS 38.214 [7].
      2> else:
         3> use the received sidelink grant to determine PSCCH duration(s) and PSSCH duration(s) for initial transmission and, if available, retransmission(s) of a single MAC PDU according to clause 8.1.2 of TS 38.214 [7].
      2> if a sidelink grant is available for retransmission(s) of a MAC PDU which has been positively acknowledged as specified in clause 5.22.1.3.3:
         3> clear the PSCCH duration(s) and PSSCH duration(s) corresponding to retransmission(s) of the MAC PDU from the sidelink grant.
   1> else if a sidelink grant has been received on the PDCCH for the MAC entity's SLCS-RNTI:
      2> if PDCCH contents indicate retransmission(s) for the identified HARQ process ID that has been set for an activated configured sidelink grant identified by sl-ConfigIndexCG:
         3> use the received sidelink grant to determine PSCCH duration(s) and PSSCH duration(s) for one or more retransmissions of a single MAC PDU according to clause 8.1.2 of TS 38.214 [7].
      2> else if PDCCH contents indicate configured grant Type 2 deactivation for a configured sidelink grant:
         3> clear the configured sidelink grant, if available;
         3> trigger configured sidelink grant confirmation for the configured sidelink grant.
      2> else if PDCCH contents indicate configured grant Type 2 activation for a configured sidelink grant:
         3> trigger configured sidelink grant confirmation for the configured sidelink grant;
         3> store the configured sidelink grant;
         3> initialise or re-initialise the configured sidelink grant to determine the set of PSCCH durations and the set of PSSCH durations for transmissions of multiple MAC PDUs according to clause 8.1.2 of TS 38.214 [7].

If the MAC entity has been configured with Sidelink resource allocation mode 2 to transmit using pool(s) of resources in a carrier as indicated in TS 38.331 [5] or TS 36.331 [21] based on sensing or random selection, the MAC entity shall for each Sidelink process:

NOTE 1: If the MAC entity is configured with Sidelink resource allocation mode 2 to transmit using a pool of resources in a carrier as indicated in TS 38.331 [5] or TS 36.331 [21], the MAC entity can create a selected sidelink grant on the pool of resources based on random selection or sensing only after releasing configured sidelink grant(s), if any.
   NOTE 2: The MAC entity expects that PSFCH is always configured by RRC for at least one pool of resources in case that at least a logical channel configured with sl-HARQ-FeedbackEnabled is set to enabled.
   1> if the MAC entity has selected to create a selected sidelink grant corresponding to transmissions of multiple MAC PDUs, and SL data is available in a logical channel:
      2> if the MAC entity has not selected a pool of resources allowed for the logical channel:
         3> select any pool of resources among the pools of resources allowed for the logical channel by the Sidelink LCP mapping restriction (see clause 5.22.1.4.1.2) and upper layers according to TS 23.387 [19];
      2> perform the TX resource (re-)selection check on the selected pool of resources as specified in clause 5.22.1.2;
   NOTE 3: The MAC entity continuously performs the TX resource (re-)selection check until the corresponding pool of resources is released by RRC or the MAC entity decides to cancel creating a configured sidelink grant corresponding to transmissions of multiple MAC PDUs.
      2> if the TX resource (re-)selection is triggered as the result of the TX resource (re-)selection check:
         3> select one of the allowed values configured by RRC in sl-ResourceReservePeriodList and set the resource reservation interval, $P_{rsvp\_TX}$, with the selected value;
         3> randomly select, with equal probability, an integer value in the interval [5, 15] for the resource reservation interval higher than or equal to 100 ms or in the interval $$\left[5 \times \left\lceil \frac{100}{\max(20, P_{rsvp\_TX})} \right\rceil, 15 \times \left\lceil \frac{100}{\max(20, P_{rsvp\_TX})} \right\rceil\right]$$

for the resource reservation interval lower than 100 ms and set SL_RESOURCE_RESELECTION_COUNTER to the selected value;
         3> select the number of HARQ retransmissions from the allowed numbers that are configured by RRC in sl-MaxTxTransNumPSSCH included in sl-PSSCH-TxConfigList and, if configured by upper layers, overlapped in sl-MaxTxTransNumPSSCH indicated in sl-CBR-PSSCH-TxConfigList for the highest priority of the logical channel(s) allowed on the carrier and the CBR measured by lower layers according to clause 5.1.27 of TS 38.215 [24] if CBR measurement results are available or the corresponding si-defaultTxConfigIndex configured by RRC if CBR measurement results are not available;

3> select an amount of frequency resources within the range that is configured by RRC between sl-MinSubChannelNumPSSCH and sl-MaxSubchannelNumPSSCH included in sl-PSSCH-TxConfigList and, if configured by RRC, overlapped between MinSubChannelNumPSSCH and MaxSubchannelNumPSSCH indicated in sl-CBR-PSSCH-TxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;

3> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier.

3> use the randomly selected resource to select a set of periodic resources spaced by the resource reservation interval for transmissions of PSCCH and PSSCH corresponding to the number of transmission opportunities of MAC PDUs determined in TS 38.214 [7];

3> if one or more HARQ retransmissions are selected:
    4> if there are available resources left in the resources indicated by the physical layer according to clause 8.1.4 of TS 38.214 [7] for more transmission opportunities:
        5> randomly select the time and frequency resources for one or more transmission opportunities from the available resources, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9];
        5> if retransmission resource(s) cannot be selected up to the selected number of HARQ retransmissions by ensuring that the resource(s) can be indicated by the time resource assignment of a prior SCI according to clause 8.3.1.1 of TS 38.212 [9]:
            [1]6> randomly select the time and frequency resources for one or more transmission opportunities from the available resources, according to the amount of selected frequency resources, the selected number of HARQ retransmissions and the remaining PDB of SL data available in the logical channel(s) allowed on the carrier.
        5> use the randomly selected resource to select a set of periodic resources spaced by the resource reservation interval for transmissions of PSCCH and PSSCH corresponding to the number of retransmission opportunities of the MAC PDUs determined in TS 38.214 [7];
        5> consider the first set of transmission opportunities as the new transmission opportunities and the other set of transmission opportunities as the retransmission opportunities;
        5> consider the set of new transmission opportunities and retransmission opportunities as the selected sidelink grant.
    3> else:
        4> consider the set as the selected sidelink grant.
3> use the selected sidelink grant to determine the set of PSCCH durations and the set of PSSCH durations according to TS 38.214 [7].

2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in sl-ProbResourceKeep:
    3> clear the configured sidelink grant, if available;
    3> randomly select, with equal probability, an integer value in the interval [5, 15] for the resource reservation interval higher than or equal to 100 ms or in the interval $$\left[5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_COUNTER to the selected value;

3> use the previously selected sidelink grant for the number of transmissions of the MAC PDUs determined in TS 38.214 [7] with the resource reservation interval to determine the set of PSCCH durations and the set of PSSCH durations according to TS 38.214 [7].

1> if the MAC entity has selected to create a selected sidelink grant corresponding to transmission(s) of a single MAC PDU, and if SL data is available in a logical channel, a SL-CSI reporting is triggered:
    2> if SL data is available in the logical channel:
        3> select any pool of resources among the pools of resources allowed for the logical channel by the Sidelink LCP mapping restriction (see clause 5.22.1.4.1.2) and upper layers according to TS 23.287 [19];
    2> else if a SL-CSI reporting is triggered:
        3> select any pool of resources among the pools of resources.
    2> perform the TX resource (re-)selection check on the selected pool of resources as specified in clause 5.22.1.2;
    2> if the TX resource (re-)selection is triggered as the result of the TX resource (re-)selection check:
        3> select the number of HARQ retransmissions from the allowed numbers that are configured by RRC in sl-MaxTxTransNumPSSCH included in sl-PSSCH-TxConfigList and, if configured by RRC, overlapped in sl-MaxTxTransNumPSSCH indicated in sl-CBR-PSSCH-TxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
3> select an amount of frequency resources within the range that is configured by RRC between sl-MinSubChannelNumPSSCH and sl-MaxSubChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PSSCH-TxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
3> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier;
3> if one or more HARQ retransmissions are selected:
4> if there are available resources left in the resources indicated by the physical layer according to clause 8.1.4 of TS 38.214 [7] for more transmission opportunities:
5> randomly select the time and frequency resources for one or more transmission opportunities from the available resources, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources, and that a retransmission resource can be indicated by the time resource assignment of a prior SCI according to clause 8.3.1.1 of TS 38.212 [9];
5> if retransmission resource(s) cannot be selected up to the selected number of HARQ retransmissions by ensuring that the resource(s) can be indicated by the time resource assignment of a prior SCI according to clause 8.3.1.1 of TS 38.212 [9]:
[2]6> randomly select the time and frequency resources for one or more transmission opportunities from the available resources, according to the amount of selected frequency resources, the selected number of HARQ retransmissions and the remaining PDB of SL data available in the logical channel(s) allowed on the carrier.
5> consider a transmission opportunity which comes first in time as the new transmission opportunity and a transmission opportunity which comes later in time as the retransmission opportunity;
5> consider both of the transmission opportunities as the selected sidelink grant;

3> else:
4> consider the set as the selected sidelink grant;
3> use the selected sidelink grant to determine PSCCH duration(s) and PSSCH duration(s) according to TS 38.214 [7].
1> if a selected sidelink grant is available for retransmission(s) of a MAC PDU which has been positively acknowledged as specified in clause 5.22.1.3.3:
2> clear the PSCCH duration(s) and PSSCH duration(s) corresponding to retransmission(s) of the MAC PDU from the selected sidelink grant.
For a selected sidelink grant, the minimum time gap between any two selected resources comprises:
a time gap between the end of the last symbol of a PSSCH transmission of the first resource and the start of the first symbol of the corresponding PSFCH reception determined by MinTimeGapPSFCH and periodPSFCHresource for the pool of resources; and
a time required for PSFCH reception and processing plus sidelink retransmission preparation including multiplexing of necessary physical channels and any TX-RX/RX-TX switching time.
NOTE: How to determine the time required for PSFCH reception and processing plus sidelink retransmission preparation is left to UE implementation.
The MAC entity shall for each PSSCH duration:
1> for each sidelink grant occurring in this PSSCH duration:
2> if the MAC entity has been configured with Sidelink resource allocation mode 1:
3> select a MCS which is, if configured, within the range that is configured by RRC between sl-MinMCS-PSSCH and sl-MaxMCS-PSSCH included in SL-ScheduledConfig.
2> else:
3> select a MCS which is, if configured, within the range that is configured by RRC between sl-MinMCS-PSSCH and sl-MaxMCS-PSSCH included in sl-PSSCH-TxConfigList and, if configured by RRC, overlapped between sl-MinMCS-PSSCH and sl-MaxMCS-PSSCH indicated in sl-CBR-PSSCH-TxConfigList for the highest priority of the sidelink logical channel(s) in the MAC PDU and the CBR measured by lower layers according to clause 5.1.27 of TS 38.215 [24] if CBR measurement results are available or the corresponding si-defaultTxConfigIndex configured by RRC if CBR measurement results are not available.
NOTE 5: MCS selection is up to UE implementation if the MCS or the corresponding range is not configured by upper layers.
2> if the configured sidelink grant has been activated and this PSSCH duration corresponds to the first PSSCH transmission opportunity within this sl-periodCG of the configured sidelink grant:
3> set the HARQ Process ID to the HARQ Process ID associated with this PSSCH duration and, if available, all subsequent PSSCH duration(s) occurring in this sl-periodCG for the configured sidelink grant;
3> determine that this PSSCH duration is used for initial transmission;
3> if a dynamic sidelink grant associated to the HARQ Process ID has been received on the PDCCH for the MAC entity's SLCS-RNTI:
4> clear the dynamic sidelink grant.

2> deliver the sidelink grant, the selected MCS, and the associated HARQ information to the Sidelink HARQ Entity for this PSSCH duration.

For configured sidelink grants, the HARQ Process ID associated with the first slot of a SL transmission is derived from the following equation:

HARQ Process ID=[floor(CURRENT_slot/sl-periodCG)]modulo nrofHARQ-Processes+sl-harq-procID-offset where CURRENT_slot=(SFN×numberOfSlotsPerFrame+ slot number in the frame), and numberOfSlotsPerFrame refer to the number of consecutive slots per frame as specified in TS 38.211 [8].

5.22.1.2 TX Resource (Re-)Selection Check

If the TX resource (re-)selection check procedure is triggered on the selected pool of resources for a Sidelink process according to clause 5.22.1.1, the MAC entity shall for the Sidelink process:
- 1> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in sl-ProbResourceKeep; or
- 1> if the pool of resources is configured or reconfigured by upper layers; or
- 1> if there is no selected sidelink grant on the selected pool of resources; or
- 1> if neither transmission nor retransmission has been performed by the MAC entity on any resource indicated in the selected sidelink grant during the last second; or
- 1> if sl-ReselectAfter is configured and the number of consecutive unused transmission opportunities on resources indicated in the selected sidelink grant is equal to sl-ReselectAfter; or
- 1> if the selected sidelink grant cannot accommodate a RLC SDU by using the maximum allowed MCS configured by upper layers in sl-MaxMCS-PSSCH and the MAC entity selects not to segment the RLC SDU; or
- NOTE 1: If the selected sidelink grant cannot accommodate the RLC SDU, it is left for UE implementation whether to perform segmentation or sidelink resource reselection.
- 1> if transmission(s) with the selected sidelink grant cannot fulfil the latency requirement of the data in a logical channel according to the associated priority, and the MAC entity selects not to perform transmission(s) corresponding to a single MAC PDU:
- NOTE 2: If the latency requirement is not met, it is left for UE implementation whether to perform transmission(s) corresponding to single MAC PDU or sidelink resource reselection.
- NOTE 3: It is left for UE implementation whether to trigger the TX resource (re-)selection due to the latency requirement of the MAC CE triggered according to clause 5.22.1.7.
  - 2> clear the selected sidelink grant associated to the Sidelink process, if available;
  - 2> trigger the TX resource (re-)selection.
- 1> if a resource(s) of the selected sidelink grant is indicated for re-evaluation or pre-emption by the physical layer as specified in clause 8.1.4 of TS 38.214 [7]; or
- 1> if retransmission of a MAC PDU on the selected sidelink grant has been dropped by either sidelink congestion control as specified in clause 8.1.6 of TS 38.214 or de-prioritization as specified in clause 16.2.4 of TS 38.213 [6], clause 5.4.2.2 of TS 36.321 [22] and clause 5.4.4:
  - 2> remove the resource(s) from the selected sidelink grant associated to the Sidelink process, if the resource(s) of the selected sidelink grant is indicated for re-evaluation or pre-emption by the physical layer;
  - 2> randomly select the time and frequency resource from the resources indicated by the physical layer as specified in clause 8.1.4 of TS 38.214 [7] for either the removed resource or the dropped resource, according to the amount of selected frequency resources, the selected number of HARQ retransmissions and the remaining PDB of either SL data available in the logical channel(s) by ensuring the minimum time gap between any two selected resources of the selected sidelink grant in case that PSFCH is configured for this pool of resources, and that a resource can be indicated by the time resource assignment of a SCI for a retransmission according to clause 8.3.1.1 of TS 38.212 [9];
  - 2> if no resource(s) is selected by ensuring that the resource(s) can be indicated by the time resource assignment of a SCI for one or more retransmissions according to clause 8.3.1.1 of TS 38.212 [9]:
    - 3> randomly select the time and frequency resources for one or more transmission opportunities from the available resources, according to the amount of selected frequency resources, the selected number of HARQ retransmissions and the remaining PDB of SL data available in the logical channel(s) allowed on the carrier.
  - 2> replace the removed or dropped resource(s) by the selected resource(s) for the selected sidelink grant.

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

NR-PDCCH: A channel carries downlink control signal which is used to control communication between a UE and a network side. A network transmits NR-PDCCH on configured control resource set (CORESET) to the UE.

UL-control signal: An UL-control signal may be scheduling request(SR), channel state information(CSI), HARQ-ACK/NACK for downlink transmission Slot: A scheduling unit in NR. Slot duration is 14 OFDM symbols.

Mini-slot: A scheduling unit with duration less than 14 OFDM symbols.

One or multiple of following assumptions for network side may be used hereafter:
Downlink timing of TRPs in the same cell are synchronized.
RRC layer of network side is in BS.

One or multiple of following assumptions for UE side may be used hereafter:
There are at least two UE (RRC) states: connected state (or called active state) and non-connected state (or called inactive state or idle state). Inactive state may be an additional state or belong to connected state or non-connected state.

For NR V2X transmission, there are two sidelink resource allocation modes defined for NR-V2X sidelink communication (as discussed in 3GPP R1-1810051 and 3GPP TS 38.214) as follows:
mode 1 is that base station/network node can schedule sidelink resource(s) to be used by UE for sidelink transmission(s); and
mode 2 is that UE determines (i.e. base station/network node does not schedule) sidelink transmission resource(s) within sidelink resources configured by base station/network node or pre-configured sidelink resources.

For network scheduling mode, e.g. NR SL mode 1, the network node may transmit a sidelink (SL) grant on Uu interface for scheduling resources of Physical Sidelink Control Channel (PSCCH) and/or Physical Sidelink Shared Channel (PSSCH). The UE may perform PSCCH and PSSCH transmissions on PC5 interface, in response to the receive sidelink grant. The Uu interface means the wireless interface for communication between network and UE. The PC5 interface means the wireless interface for communication (directly) between UEs or devices.

For UE (autonomous) selection mode, e.g. NR SL mode 2, since sidelink transmission resource is not scheduled via network, the UE may require performing sensing before selecting resource(s) for sidelink transmission (e.g., sensing-based transmission), in order to avoid resource collision and interference from or to other UEs. In step 1 (as discussed in 3GPP R1-1909942), based on sensing result, the UE can identify or determine a valid candidate resource set from candidate resources within the resource selection window. The valid candidate resource set may be reported to higher layers (of the UE). The UE may randomly select one or multiple sidelink resources from the valid candidate resource set, and then perform sidelink transmission(s) on the selected sidelink resource(s) from the UE. The sidelink transmission(s) from the UE may be PSCCH and/or PSSCH transmission.

To enhance reliability and reduce latency for NR SL mode 2, one objective of WID [3] (as discussed in 3GPP RP-201385) is to study inter-UE coordination, as described as follows: "A set of resources is determined at UE-A. This set is sent to UE-B in mode 2, and UE-B takes this into account in the resource selection for its own transmission." Such inter-UE coordination may consider to solve some of sidelink problems—e.g. Hidden-node problem, Exposed-node problem, Half duplex problem (as discussed in 3GPP R1-20005255), Consecutive packet loss, and Resource collision.

In the RAN1 #102-e meeting, there is some discussion about detail of inter-UE coordination (as discussed in the "FL summary #1 for AI 8.11.2.2 Feasibility and benefits for mode 2 enhancements") as follows:
When a set of resources determined at UE-A is sent to UE-B in mode 2 and UE-B takes this into account in the resource selection for its own transmission,
for the definition of "a set of resources", at least followings can be considered:
Resource set which is preferred for UE-B's transmission
e.g.,
Resource set which is preferred for UE-A's reception
Resource set which is preferred for intended receiver(s) of UE-B's transmission
Resource set which is preferred not to be used by UE-B's transmission
e.g.,
Resource set which is not preferred for UE-A's reception
Resource set with a problem for intended receiver(s) of UE-B's transmission
FFS: whether the "resource set" in above candidates can individually refer to the resources in the past, in the future, or in both past and future.
When a set of resources determined at UE-A is sent to UE-B in mode 2 and UE-B takes this into account in the resource selection for its own transmission,
for the condition when UE-A sends "a set of resources" to UE-B, at least followings can be considered:
Option 1: Based on signaling of triggering or requesting
Option 2: Based on a pre-defined or (pre)configured triggering condition(s)
When a set of resources determined at UE-A is sent to UE-B in mode 2 and UE-B takes this into account in the resource selection for its own transmission,
for the container carrying "a set of resources", at least followings are considered:
MAC message
PC5-RRC signaling
New 2nd-stage SCI format
When a set of resources determined at UE-A is sent to UE-B in mode 2,
for how UE-B takes "a set of resources" into account in the resource selection for its own transmission, at least followings are considered:
"A set of resources" is taken into account to determine a candidate TX resource set in the resource selection procedure
"A set of resources" is taken into account to trigger resource re-selection
Currently, there are mainly two possible designs of the set of resources, send from UE-A to UE-B.

One possible design is a (white) resource set which is preferred for UE-B's transmission (to at least the UE-A). The UE-A may determine or derive the (white) resource set by itself. In one embodiment, the (white) resource set may comprise one or multiple resources preferred for UE-A's reception. Alternatively, the (white) resource set may comprise one or multiple resources preferred for intended receiver(s), at least UE-A's receiver, of UE-B's transmission.

The other possible design is a (black) resource set which is preferred not to be used for UE-B's transmission (to at least the UE-A). The UE-A may determine or derive the (black) resource set by itself. In one embodiment, the (black) resource set may comprise one or multiple resources not preferred for UE-A's reception. Alternatively, the (black) resource set may comprise one or multiple resources not preferred for intended receiver(s), at least UE-A's receiver, of UE-B's transmission.

When UE-B receives the set of resources (from UE-A), UE-B can take the set of resources into account in resource selection of its own transmission (to at least the UE-A).

One possible way is that when UE-B performs resource selection procedure for performing transmission (to at least the UE-A), the UE-B may determine or derive a valid candidate resource set, and then select one or more resources from the valid candidate resource set. In one embodiment, the valid candidate resource set may include the (white) resource set send from UE-A. Alternatively, the determination or derivation of the valid candidate resource set may exclude the (black) resource set send from UE-A.

Another possible way is that when UE-B performs resource selection procedure for performing transmission (to at least the UE-A), the UE-B may determine or derive a valid candidate resource set, and then select one or more resources from the valid candidate resource set. In one embodiment, the UE-B may prioritize to select a resource, which is in the (white) resource set send from UE-A, from the valid candidate resource set. Alternatively, the UE-B may deprioritize to select a resource, which is in the (black) resource set send from UE-A, from the valid candidate resource set. The UE-B may prevent or preclude from selecting a resource, which is in the (black) resource set send from UE-A, from the valid candidate resource set.

Another possible way is that UE-B may trigger resource re-selection based on the set of resources send from UE-A. For instance, the UE-B selects one or more resources in resource selection procedure for performing transmission (to at least the UE-A). In one embodiment, if the UE-B finds or detects a selected resource is not comprised in the (white) resource set, the UE-B may perform resource re-selection to determine or select a new resource to replace the originally selected resource. If the UE-B finds or detects a selected resource is comprised in the (white) resource set, the UE-B may not perform resource re-selection.

Alternatively, if the UE-B finds or detects a selected resource is comprised in the (black) resource set, the UE-B may perform resource re-selection to determine or select a new resource to replace the originally selected resource. If the UE-B finds or detects a selected resource is not comprised in the (black) resource set, the UE-B may not perform resource re-selection.

Currently, there is no discussion or design on UE-A behavior after sending the set of resources to UE-B. To achieve the benefit of inter-UE coordination, corresponding UE-A behavior shall be designed and specified. Moreover, the UE-A is possible to have sidelink communication to separate UE(s) and is possible to have different sidelink services with different target UEs and QoS requirements. In this scenario, it needs further study on the influence, due to the set of resources to UE-B, on other sidelink communications.

Another scenario is that UE A has received one (B-to-A) resource set reported by UE B in earlier time. When UE A generates or derives a (A-to-B) set of resource for reporting to UE B, and if the (A-to-B) set of resource includes one resource also in the one (B-to-A) resource set reported by UE B, how UE A and UE B consider or handle the one resource may need to study. Some mechanisms, methods, and embodiments are provided below.

Method a-1

A first device may send or report a resource set to a second device. The second device may take the resource set into account when the second device performs resource selection for performing sidelink transmission (to at least the first device).

In one embodiment, the resource set may comprise one or more sidelink resources preferred for the second device's transmission (to at least the first device). The resource set may comprise one or more sidelink resources preferred for the first device's reception (e.g. from the second device or from other device(s)). The resource set may comprise one or more sidelink resources preferred for intended receiver(s), at least the first device's receiver, of the second device's transmission.

In one embodiment, the one or more sidelink resources in the resource set may be (located) in one or more slots. The one or more sidelink resources may be in a first sidelink resource pool in a carrier or cell. The carrier or cell may comprise at least the first sidelink resource pool and a second sidelink resource pool.

The general concept of method a-1 is that when the first device performs sidelink resource (re-)selection procedure for selecting a first sidelink resource, the first device may prevent or preclude from selecting or determining (any of) the one or more sidelink resources in the resource set for selecting the first sidelink resource. In one embodiment, when the first device performs sidelink resource (re-)selection procedure for selecting a first sidelink resource, the first device may prevent or preclude from selecting or determining (any) sidelink resources in the one or more slots in the first sidelink resource pool for selecting the first sidelink resource. When the first device performs sidelink resource (re-)selection procedure for selecting a first sidelink resource, the first device may prevent or preclude from selecting or determining (any) sidelink resources in the one or more slots in the second sidelink resource pool in the carrier/cell for selecting the first sidelink resource.

In one embodiment, when the first device performs sidelink resource (re-)selection procedure for selecting a first sidelink resource, the first device may exclude (all) the one or more sidelink resources in the resource set for selecting the first sidelink resource. When the first device performs sidelink resource (re-)selection procedure for selecting a first sidelink resource, the first device may exclude (all) candidate sidelink resources in the one or more slots in the first sidelink resource pool for selecting the first sidelink resource. When the first device performs sidelink resource (re-)selection procedure for selecting a first sidelink resource, the first device may exclude (all) candidate sidelink resources in the one or more slots in the second sidelink resource pool in the carrier or cell for selecting the first sidelink resource.

In one embodiment, when the first device performs sidelink resource (re-)selection procedure for selecting a first sidelink resource, the first device may exclude (all) the one or more sidelink resources in the resource set from being candidate sidelink resources for selecting the first sidelink resource. When the first device performs sidelink resource (re-)selection procedure for selecting a first sidelink resource, the first device may exclude (all) sidelink resources in the one or more slots in the first sidelink resource pool from being candidate sidelink resources for selecting the first sidelink resource. When the first device performs sidelink resource (re-)selection procedure for selecting a first sidelink resource, the first device may exclude (all) sidelink resources in the one or more slots in the second sidelink resource pool in the carrier or cell from being candidate sidelink resources for selecting the first sidelink resource.

In one embodiment, one motivation could be to guarantee the first device could detect the second device's sidelink transmission (to at least the first device) on the one or more slots. In other words, data packet loss on the one or more slots could be avoided.

In one embodiment, the first device may perform the sidelink resource (re-)selection procedure for selecting the first sidelink resource, after the first device sends or reports the resource set to the second device. The first device may perform the sidelink resource (re-)selection procedure for selecting the first sidelink resource, within a time duration. The starting timing of the time duration may be associated with sending or reporting timing of the resource set. The starting timing of the time duration could be in the same slot of sending or reporting timing of the resource set. Time length of the time duration may be (pre-)configured (e.g. by PC5-RRC signaling) or specified. Time length of the time duration may be determined or derived by the first device. The first device may inform the time length of the time duration when sending or reporting the resource set to the second device. The first device may determine or derive the time length of the time duration based on speed or velocity of the first device.

In one embodiment, the first sidelink resource may be selected for delivering a first data packet associated with a first priority. The first data packet may be delivered from the first device to at least the second device. The destination identity of the first data packet may be associated with at least the second device. Alternatively, the first data packet may not be delivered to the second device. The destination identity of the first data packet may not be associated with the second device.

In one embodiment, the resource set may be associated with a second priority. The first device may or may not inform the second priority when sending or reporting the resource set to the second device. The first device may generate, derive, or determine the resource set based on the second priority. The second priority may be indicated by the second device. The first device may determine or derive the second priority based on supported services or logical channels between the first device and the second device. The first device may determine, derive, or set the second priority as the highest priority of supported logical channel between the first device and the second device.

In one embodiment, the first device could determine whether to select the first sidelink resource via or with considering or taking the resource set into account or not, based on at least the first priority and/or the second priority. The first device could determine whether to perform sidelink resource (re-)selection procedure for selecting the first sidelink resource with above exclusion, prevention, or preclusion or not, based on at least the first priority and/or the second priority.

In one embodiment, the first priority may be (relatively) lower than the second priority. (For instance, the first priority value is larger than the second priority value.) If the first priority is (relatively) lower than the second priority, the first device may perform sidelink resource (re-)selection procedure for selecting the first sidelink resource with above exclusion or prevention or preclusion.

In one embodiment, the first priority may be (relatively) higher than the second priority. (For instance, the first priority value is smaller than the second priority value.) If the first priority is (relatively) higher than the second priority, the first device may perform sidelink resource (re-)selection procedure for selecting the first sidelink resource without above exclusion or prevention or preclusion.

Additionally or alternatively, if the first priority is a specific priority or is (relatively) higher than the specific priority, the first device may perform sidelink resource (re-)selection procedure for selecting the first sidelink resource without above exclusion or prevention or preclusion. If the first priority is not the specific priority or is (relatively) lower than the specific priority, the first device may perform sidelink resource (re-)selection procedure for selecting the first sidelink resource with above exclusion or prevention or preclusion.

In one embodiment, the specific priority may be (pre-)configured (e.g. pool-specific configuration or PC5 link/connection-specific configuration) or specified. The priority value of the specific priority may be 1.

In one embodiment, the specific priority may be determined or derived from the second priority. The priority value of the specific priority may be the same as a value of "the priority value of the second priority+a priority offset". The priority value of the specific priority may be the same as a value of "the priority value of the second priority—a priority offset". The priority offset may be (pre-)configured or specified.

Additionally or alternatively, if the first data packet comprises sidelink data from specific logical channel(s) or associated with specific service (requirement), the first device may perform sidelink resource (re-)selection procedure for selecting the first sidelink resource without above exclusion or prevention or preclusion.

In one embodiment, if the first data packet does not comprise sidelink data from specific logical channel(s) or associated with specific service requirement, the first device may perform sidelink resource (re-)selection procedure for selecting the first sidelink resource with above exclusion or prevention or preclusion.

In one embodiment, the specific logical channel may be (pre-)configured (e.g. PC5 link/connection-specific configuration) or specified. The specific logical channel may be a logical channel (pre-)configured as not restricted by the resource set. The specific service requirement may be low latency requirement. The specific service may be a service with low latency requirement. The first data packet may be Ultra-Reliable and Low Latency Communication (URLLC) data.

Additionally or alternatively, the first device and/or the second device could be (pre)-configured with a priority threshold or a priority value threshold. The priority threshold and/or the priority value threshold could be associated to the first sidelink resource pool or the second sidelink resource pool. The priority threshold and/or the priority value threshold could be associated to sl-PreemptionEnable. The priority threshold and/or the priority value threshold could be a numerical value indicated by sl-PreemptionEnable. The priority threshold and/or the priority value threshold could be sl-PreemptionEnable.

In one embodiment, the first device could determine whether to select the first sidelink resource via considering or taking the resource set into account, based on at least the first priority, the second priority and the priority (value) threshold. If the first priority is (relatively) higher than the second priority and the first priority is higher than the priority threshold, the first device may perform sidelink resource (re-)selection procedure for selecting the first sidelink resource without above exclusion or prevention or preclusion. If the first priority is (relatively) lower than the second priority or the first priority is lower than the priority threshold, the first device may perform sidelink resource (re-)selection procedure for selecting the first sidelink resource with above exclusion or prevention or preclusion.

In one embodiment, one motivation for the priority threshold could be that unless the first priority is more important than protected priority threshold and the second priority, the first device would select the first sidelink resource by considering the above exclusion or preclusion for preventing half duplex issue. Another motivation for using sl-PreemptionEnable could be to simplify design. The parameter sl-PreemptionEnable, configured for a sidelink resource pool, could provide the priority threshold not only used for preempting device to perform preempting but could also be used for determining whether to perform sidelink resource (re-)selection procedure with or without above exclusion or prevention or preclusion.

In one embodiment, one sidelink resource in the resource set may mean a time-frequency resource. One sidelink resource may be located in one slot in time domain, and may comprise at least one sub-channel in frequency domain. One slot among the one or more slot may comprise one or multiple sidelink resources among the one or more sidelink resources in the resource set. The slot number of the one or more slot may be smaller than or equal to the resource number of the one or more sidelink resources in the resource set.

In one embodiment, the one or more sidelink resources in the resource set may be or may comprise all sidelink resources (located) in the one or more slots in the carrier or cell. The one or more sidelink resources in the resource set may be or may comprise all sidelink resources (located) in the one or more slots in the first resource pool. The first device may send or report the information of the one or more slots. The first device may not send or report sub-channel information of the one or more sidelink resources.

In one embodiment, one resource set may comprise or indicate sidelink resource(s) (only) within one sidelink resource pool. The first device may send or report multiple resource sets associated with multiple sidelink resource pools. The first device may inform the pool index of the first sidelink resource pool when sending or reporting the resource set to the second device.

In one embodiment, one resource set may comprise or indicate sidelink resource(s) in multiple sidelink resource pools. The first device may send or report one resource set associated with multiple sidelink resource pools. The first device may inform the carrier or cell index of the carrier or cell when sending or reporting the resource set to the second device. The second sidelink resource pool may be different from the first sidelink resource pool.

In one embodiment, the first device could operate in device selection mode (e.g. NR sidelink resource allocation mode 2) to acquire the first sidelink resource.

Method a-2

A first device may send or report a resource set to a second device. The second device may take the resource set into account when the second device performs resource selection for performing sidelink transmission (to at least the first device).

In one embodiment, the resource set may comprise one or more sidelink resources not preferred for the second device's transmission (to at least the first device). The resource set may comprise one or more sidelink resources not preferred for the first device's reception (e.g. from the second device or from other device(s)). The resource set may comprise one or more sidelink resources not preferred for intended receiver(s), at least the first device's receiver, of the second device's transmission.

In one embodiment, the one or more sidelink resources in the resource set may be (located) in one or more slots. The one or more sidelink resources may be in a first sidelink resource pool in a carrier or cell. The carrier or cell may comprise at least the first sidelink resource pool and a second sidelink resource pool.

In one embodiment, the first device may derive or determine a complement or contrary resource set at least based on the resource set. The complement or contrary resource set may not comprise any one or more sidelink resources in the resource set. The complement or contrary resource set may not comprise any sidelink resources in the one or more slots. The complement or contrary resource set may comprise another one or more sidelink resources preferred for the second device's transmission (to at least the first device). The complement or contrary resource set may comprise another one or more sidelink resources preferred for the first device's reception (e.g. from the second device or from other device(s)). The complement or contrary resource set may comprise another one or more sidelink resources preferred for intended receiver(s), at least the first device's receiver, of the second device's transmission. In one embodiment, the first device may perform method a-1 based on the complement or contrary resource set.

In one embodiment, the first device may (already) reserve or select or be scheduled or indicated to perform sidelink transmission in one sidelink resource of the one or more sidelink resources. The first device may (already) reserve or select or be scheduled or indicated to perform sidelink transmission in one slot of the one or more slots.

Additionally or alternatively, the first device may generate, derive, or determine the resource set based on (already) reserved, selected, scheduled, or indicated sidelink resource(s) to perform sidelink transmission. The first device may include (already) reserved, selected, scheduled, or indicated sidelink resource(s), to perform sidelink transmission, in the resource set. The (already) reserved, selected, scheduled, or indicated sidelink resource(s) may comprise one sidelink resource.

Additionally or alternatively, the first device may generate, derive, or determine the resource set based on other device(s)' reservation or indication on sidelink resources. The first device may include (some) sidelink resource(s) reserved or indicated by other device(s), in the resource set. The sidelink resources(s) reserved or indicated by other device(s) may be utilized not for transmitting to the first device. Alternatively, the sidelink resources(s) reserved or indicated by other device(s) may be utilized for transmitting to at least the first device. The sidelink resources(s) reserved or indicated by other device(s) may comprise one sidelink resource. The other device(s)' reservation or indication on sidelink resources may be received or detected by the first device with received (reference signal) power higher than power threshold.

In one embodiment, the resource set may be associated with a second priority. The first device may or may not inform the second priority when sending or reporting the resource set to the second device. The first device may generate, derive, or determine the resource set based on the second priority. The second priority may be indicated by the second device. The first device may determine or derive the second priority based on supported services or logical channels between the first device and the second device. The first device may determine, derive, or set the second priority as the highest priority of supported logical channel between the first device and the second device.

In one embodiment, power threshold could be value in one entry in sl-ThresPSSCH-RSRP-List-r16. The power threshold could be derived based on the second priority and priority of other device(s)' reservation or indication on sidelink resources. The power threshold could be associated to the n-th entry sl-ThresPSSCH-RSRP-List-r16. n could be derived from the second priority and priority of other device(s)' reservation or indication on sidelink resources. n could be a function of priority value associated to priority of other device(s)' reservation or indication on sidelink resources, and priority value associated to the second priority. n could be a priority value associated to priority of other device(s)' reservation/indication on sidelink resources+(priority value associated to the second priority−1)*8. n could be associated to Th (priority value associated to priority of other device(s)' reservation/indication on the sidelink resources, priority value associated to the second priority). The priority value could be an integer of 1 to 8. Priority value 1 could be associated to highest priority and priority value 8 is associated to lowest priority. Priority value with lower value could be associated to higher priority.

In one embodiment, when the first device performs sidelink resource (re-)selection procedure for selecting a first sidelink resource, the first device may prevent or preclude from selecting or determining the one sidelink resource for selecting the first sidelink resource. When the first device performs sidelink resource (re-)selection procedure for selecting a first sidelink resource, the first device may prevent or preclude from selecting or determining (any) sidelink resources in the one slot in the first sidelink resource pool for selecting the first sidelink resource. When the first device performs sidelink resource (re-)selection procedure for selecting a first sidelink resource, the first device may prevent or preclude from selecting or determining (any) sidelink resources in the one slot in the second sidelink resource pool in the carrier/cell for selecting the first sidelink resource.

In one embodiment, when the first device performs sidelink resource (re-)selection procedure for selecting a first sidelink resource, the first device may exclude the one sidelink resource for selecting the first sidelink resource. When the first device performs sidelink resource (re-)selection procedure for selecting a first sidelink resource, the first device may exclude (all) candidate sidelink resources in the one slot in the first sidelink resource pool for selecting the first sidelink resource. When the first device performs sidelink resource (re-)selection procedure for selecting a first sidelink resource, the first device may exclude (all) candidate sidelink resources in the one slot in the second sidelink resource pool in the carrier or cell for selecting the first sidelink resource.

In one embodiment, when the first device performs sidelink resource (re-)selection procedure for selecting a first sidelink resource, the first device may exclude the one sidelink resource from being candidate sidelink resources for selecting the first sidelink resource. When the first device performs sidelink resource (re-)selection procedure for selecting a first sidelink resource, the first device may exclude (all) sidelink resources in the one slot in the first sidelink resource pool from being candidate sidelink resources for selecting the first sidelink resource. When the first device performs sidelink resource (re-)selection procedure for selecting a first sidelink resource, the first device may exclude (all) sidelink resources in the one slot in the second sidelink resource pool in the carrier or cell from being candidate sidelink resources for selecting the first sidelink resource.

In one embodiment, the first device may reserve or select or be scheduled or indicated to perform sidelink transmission in the one sidelink resource of the one or more sidelink resources, before the first device sends or reports the resource set to the second device. The first device may reserve or select or be scheduled/indicated to perform sidelink transmission in the one sidelink resource of the one or more sidelink resources, after the first device sends/reports the resource set to the second device. The first device may reserve or select or be scheduled or indicated to perform sidelink transmission in the one sidelink resource of the one or more sidelink resources, before the first device performs the sidelink resource (re-)selection procedure for selecting the first sidelink resource.

In one embodiment, the first device may not reserve or select or may not be scheduled or indicated to perform sidelink transmission in one sidelink resource of the one or more sidelink resources, before the first device performs sidelink resource (re-)selection procedure for selecting a first sidelink resource. The first device may not reserve or select or may be scheduled or indicated to perform sidelink transmission in one slot of the one or more slots, before the first device performs sidelink resource (re-)selection procedure for selecting a first sidelink resource.

Additionally or alternatively, the first device may generate, derive, or determine the resource set based on other device(s)' reservation or indication on sidelink resources. The first device may include (some) sidelink resource(s) reserved or indicated by other device(s), in the resource set. The sidelink resources(s) reserved or indicated by other device(s) may be utilized not for transmitting to the first device. The sidelink resources(s) reserved or indicated by other device(s) may comprise one sidelink resource. The other device(s)' reservation or indication on sidelink resources may be received or detected by the first device with received (reference signal) power higher than power threshold.

In one embodiment, when the first device performs sidelink resource (re-)selection procedure for selecting the first sidelink resource, the first device may be able or allowed to select or determine the one sidelink resource for selecting the first sidelink resource. When the first device performs sidelink resource (re-)selection procedure for selecting a first sidelink resource, the first device may be able or allowed to select or determine (any) sidelink resources in the one slot in the first sidelink resource pool for selecting the first sidelink resource. When the first device performs sidelink resource (re-)selection procedure for selecting a first sidelink resource, the first device may be able or allowed to select or determine (any) sidelink resources in the one slot in the second sidelink resource pool in the carrier or cell for selecting the first sidelink resource.

In one embodiment, the first device may detect at least one sidelink resource reservation on a specific slot (for retransmission of a TB within a signaling window or a periodic reservation) from a third device (such as the other device(s)). The specific slot could be included in the one or more slots. In one embodiment, one motivation could be the first device reports the specific slot (included in the one or more slots) for preventing (possible) collision between sidelink transmission on the specific slot from the second device and the third device. The first device may (already) reserve one resource in a specific slot, or the first device has selected one resource in the specific slot, or the first device derives that higher interference on one or more resources in the specific slot (based on sensing result). In one embodiment, one motivation may be the first device may report the specific slot or the one resource on the specific slot to prevent half duplex issue or prevent from higher interference resource reception since the report could assist the second device to select or identify resource.

In one embodiment, the first device could perform the sidelink resource (re-)selection procedure for selecting the first sidelink resource, after the first device sends or reports the resource set to the second device. The first device could perform the sidelink resource (re-)selection procedure for selecting the first sidelink resource, within a time duration. The starting timing of the time duration would be associated with sending or reporting timing of the resource set. The starting timing of the time duration could be in the same slot of sending or reporting timing of the resource set. The time length of the time duration may be (pre-)configured or specified. The time length of the time duration may be determined or derived by the first device. The first device may inform the time length of the time duration when sending or reporting the resource set to the second device. The first device may determine or derive the time length of the time duration based on the speed or velocity of the first device.

In one embodiment, one sidelink resource in the resource set may mean a time-frequency resource. One sidelink resource may be located in one slot in time domain and comprise at least one sub-channel in frequency domain. One slot among the one or more slot may comprise one or multiple sidelink resources among the one or more sidelink resources in the resource set. The slot number of the one or more slot may be smaller than or equal to the resource number of the one or more sidelink resources in the resource set.

In one embodiment, the one or more sidelink resources in the resource set may be or may comprise all sidelink resources (located) in the one or more slots in the carrier or cell. The one or more sidelink resources in the resource set may be or may comprise all sidelink resources (located) in the one or more slots in the first resource pool. The first device may send or report the information of the one or more slots. The first device may not send or report sub-channel information of the one or more sidelink resources.

In one embodiment, one resource set may comprise or indicate sidelink resource(s) (only) within one sidelink resource pool. The first device may send or report multiple resource sets associated with multiple sidelink resource pools. The first device may inform the pool index of the first sidelink resource pool when sending or reporting the resource set to the second device.

In one embodiment, one resource set may comprise or indicate sidelink resource(s) in multiple sidelink resource pools. The first device may send or report one resource set associated with multiple sidelink resource pools. The first device may inform the carrier or cell index of the carrier or cell when sending or reporting the resource set to the second device. The second sidelink resource pool may be different from the first sidelink resource pool. The first device could operate in device selection mode (e.g. NR sidelink resource allocation mode 2) to acquire the first sidelink resource.

Method b-1

A first device may send or report a resource set to a second device. The second device may take the resource set into account when the second device performs resource selection for performing sidelink transmission (to at least the first device).

In one embodiment, the resource set may comprise one or more sidelink resources preferred for the second device's transmission (to at least the first device). The resource set may comprise one or more sidelink resources preferred for the first device's reception (e.g. from the second device or from other device(s)). The resource set may comprise one or more sidelink resources preferred for intended receiver(s), at least the first device's receiver, of the second device's transmission.

In one embodiment, the one or more sidelink resources in the resource set may be (located) in one or more slots. The one or more sidelink resources may be in a first sidelink resource pool in a carrier or cell. The carrier or cell may comprise at least the first sidelink resource pool and a second sidelink resource pool.

The general concept of method b-1 is that the first device (shall or restricts to) performs sidelink reception or monitoring for the one or more sidelink resources, unless specific condition occurs. In one embodiment, the first device (shall or be restricted to) performs sidelink reception or monitoring in the one or more slots in the carrier or cell, unless specific condition occurs.

More specifically, if the specific condition does not occur, the first device (shall or be restricted to) performs sidelink reception or monitoring for the one or more sidelink resources. If the specific condition occurs, the first device may perform sidelink transmission on one sidelink resource of the one or more sidelink resources. More specifically, if the specific condition does not occur, the first device (shall or be restricted to) performs sidelink reception or monitoring in the one or more slots in the carrier or cell. If the specific condition occurs, the first device may perform sidelink transmission in one slot of the one or more slots in the carrier or cell.

In one embodiment, the resource set may be associated with a second priority. The first device may or may not inform the second priority when sending or reporting the resource set to the second device. The first device may generate, derive, or determine the resource set based on the second priority. The second priority may be indicated by the second device. The first device may determine or derive the second priority based on supported services or logical channels between the first device and the second device. The first device may determine, derive, or set the second priority as the highest priority of supported logical channel between the first device and the second device.

In one embodiment, there may be possible specific conditions or scenarios. Any of the specific conditions or scenarios may be combined or applied simultaneously or applied separately.

Condition or Scenario 1

In one embodiment, the first device may receive a sidelink grant from network node (to the first device), wherein the sidelink grant schedules or indicates at least a third sidelink resource. The first device could operate in network scheduling mode (e.g. NR sidelink resource allocation mode 1) to acquire the third sidelink resource.

In one embodiment, the specific condition may be that the third sidelink resource overlaps with one sidelink resource of the one or more sidelink resources. The specific condition may be that the third sidelink resource is in one slot of the one or more slots in the carrier or cell.

In one embodiment, the first device may determine to utilize the third sidelink resource to deliver a third data packet associated with a third priority. The third data packet may be delivered from the first device to at least the second device. The destination identity of the third data packet may be associated with at least the second device. Alternatively, the third data packet may be delivered not to the second device. The destination identity of the third data packet may not be associated with the second device.

In one embodiment, the specific condition may be that the third sidelink resource overlaps with one sidelink resource of the one or more sidelink resources and the third priority is (relatively) higher than the second priority. (For instance, the third priority value is smaller than the second priority value). The specific condition may be that the third sidelink resource is in one slot of the one or more slots in the carrier/cell and the third priority is (relatively) higher than the second priority. (For instance, the third priority value is smaller than the second priority value).

In one embodiment, the specific condition may be that the third sidelink resource overlaps with one sidelink resource of the one or more sidelink resources and the third priority is a specific priority or is (relatively) higher than the specific priority. The specific condition may be that the third sidelink resource is in one slot of the one or more slots in the carrier or cell, and the third priority is a specific priority or is (relatively) higher than the specific priority. The specific priority may be (pre-)configured or specified. The priority value of the specific priority may be 1. The specific priority may be determined or derived from the second priority. The priority value of the specific priority may be the same as a value of "the priority value of the second priority+a priority offset". The priority value of the specific priority may be the same as a value of "the priority value of the second priority—a priority offset". The priority offset may be (pre-)configured or specified.

In one embodiment, the first device and/or the second device could be (pre)-configured with a priority threshold or a priority value threshold. The priority threshold and/or the priority value threshold may be associated to the first sidelink resource pool or the second sidelink resource pool. The priority threshold and/or the priority value threshold may be associated to sl-PreemptionEnable. The priority threshold and/or the priority value threshold may be a numerical value indicated by sl-PreemptionEnable. The priority threshold and/or the priority value threshold may be sl-PreemptionEnable. The specific condition may be that the third sidelink resource is in one slot of the one or more slots in the carrier or cell, and the third priority may be higher than the priority threshold. The parameter sl-PreemptionEnable, configured for a sidelink resource pool, could provide the priority threshold not only used for preempting device to perform preempting but also used for determining whether to switch same device's behaviour for a slot from RX to TX.

In one embodiment, the specific condition may be that the third sidelink resource overlaps with one sidelink resource of the one or more sidelink resources and the third data packet comprises sidelink data from specific logical channel (s) or associated with specific service (requirement). The specific condition may be that the third sidelink resource is in one slot of the one or more slots in the carrier or cell, and the third data packet may comprise sidelink data from specific logical channel(s) or associated with specific service (requirement). The specific logical channel may be (pre-)configured or specified. The specific logical channel may be a logical channel (pre-)configured as not restricted by the resource set. The specific service requirement may be low latency requirement. The specific service may be a service with low latency requirement. The first data packet may be URLLC data.

In one embodiment, the first device may perform a third sidelink transmission on the third sidelink resource. The first device does not perform sidelink reception or monitoring in the slot of the third sidelink resource. The third sidelink resource may be in the first sidelink resource pool. Alternatively, the third sidelink resource may be in the second sidelink resource pool.

Condition or Scenario 2

In one embodiment, the first device may receive a third sidelink control information or a sidelink grant from a third device, which reserves or indicates at least a third sidelink resource. The third sidelink resource could be reserved or indicated for the first device to perform a third sidelink transmission. The third device and the second device may be different devices. Alternatively, the third device and the second device may be the same device.

In one embodiment, the specific condition may be that the third sidelink resource overlaps with one sidelink resource of the one or more sidelink resources. The specific condition may be that the third sidelink resource is in one slot of the one or more slots in the carrier or cell.

In one embodiment, the first device may determine to utilize the third sidelink resource to deliver a third data packet associated with a third priority. The third data packet may be delivered from the first device to at least the third device. The destination identity of the third data packet is associated with at least the third device. Alternatively, the third data packet may be delivered not to the third device. The destination identity of the third data packet may not be associated with the third device.

In one embodiment, the specific condition may be that the third sidelink resource overlaps with one sidelink resource of the one or more sidelink resources and the third priority is (relatively) higher than the second priority. (For instance, the third priority value is smaller than the second priority value.) The specific condition may be that the third sidelink resource is in one slot of the one or more slots in the carrier or cell and the third priority is (relatively) higher than the second priority. (For instance, the third priority value is smaller than the second priority value.)

In one embodiment, the specific condition may be that the third sidelink resource overlaps with one sidelink resource of the one or more sidelink resources and the third priority is a specific priority or is (relatively) higher than the specific priority. The specific condition may be that the third sidelink resource is in one slot of the one or more slots in the carrier or cell, and the third priority may be a specific priority or is (relatively) higher than the specific priority. The specific priority may be (pre-)configured or specified. The priority value of the specific priority may be 1. The specific priority may be determined or derived from the second priority. The priority value of the specific priority may be the same as a value of "the priority value of the second priority+a priority offset".

In one embodiment, the priority value of the specific priority may be the same as a value of "the priority value of the second priority−a priority offset". The priority offset may be (pre-)configured or specified. The first device and/or the second device could be (pre)-configured with a priority threshold or a priority value threshold. The priority threshold and/or the priority value threshold may be associated to the first sidelink resource pool or the second sidelink resource pool. The priority threshold and/or the priority value threshold may be associated to sl-PreemptionEnable. The priority threshold and/or the priority value threshold may be a numerical value indicated by sl-PreemptionEnable. The priority threshold and/or the priority value threshold may be sl-PreemptionEnable.

In one embodiment, the specific condition may be that the third sidelink resource is in one slot of the one or more slots in the carrier or cell and the third priority is higher than the priority threshold. The parameter sl-PreemptionEnable, configured for a sidelink resource pool, could provide the priority threshold not only used for preempting device to perform preemption but also used for determining whether to switch same device's behaviour for a slot from RX to TX.

In one embodiment, the specific condition may be that the third sidelink resource overlaps with one sidelink resource of the one or more sidelink resources and the third data packet comprises sidelink data from specific logical channel(s) or associated with specific service (requirement). The specific condition may be that the third sidelink resource is in one slot of the one or more slots in the carrier or cell and the third data packet comprises sidelink data from specific logical channel(s) or associated with specific service (requirement). The specific logical channel may be (pre-)configured or specified. The specific logical channel may be a logical channel (pre-)configured as not restricted by the resource set. The specific service requirement may be low latency requirement. The specific service may be a service with low latency requirement. The first data packet may be URLLC data.

In one embodiment, the first device may perform the third sidelink transmission on the third sidelink resource. The first device may not perform sidelink reception/monitoring in the slot of the third sidelink resource. The third sidelink resource may be in the first sidelink resource pool. Alternatively, the third sidelink resource may be in the second sidelink resource pool.

Condition or Scenario 3

In one embodiment, the first device may receive another resource set from a third device, which comprise at least a third sidelink resource. The third sidelink resource in the another resource set may be preferred for the first device's transmission (to at least the third device). The third sidelink resource in the another resource set may be preferred for the third device's reception (e.g. from the first device or from other device(s)). The third sidelink resource in the another resource set may be preferred for intended receiver(s), at least the third device's receiver, of the first device's transmission.

In one embodiment, the third device and the second device may be different devices. Alternatively, the third device and the second device may be the same device. When the first generates the resource set to the second device, and the third device and the second device are the same device, the first device may not be allowed or prevent from including (any) resource in the another resource set to the one resource set. Alternatively, if the first device has received the another resource set from the second device, the first device could include a specific resource in the another resource set into the resource set. In one embodiment, including the specific resource in the resource set may imply that the first device coordinates or determines that the second device could perform sidelink transmission and/or the first device may not perform sidelink transmission on the specific resource or at the timing of the specific resource or at the slot comprising the specific resource.

In one embodiment, the specific condition may be that the third sidelink resource overlaps with one sidelink resource of the one or more sidelink resources. The specific condition may be that the third sidelink resource is in one slot of the one or more slots in the carrier or cell.

In one embodiment, another resource set may be associated with a third priority. The first device may acquire or know the third priority when receiving another resource set. The first device may indicate the third priority to the third device before receiving another resource set. The first device may request the third device to transmit or report another resource set, and/or indicate the third priority when requesting. The third device may generate, derive, or determine another resource set based on the third priority. The third priority may be indicated by the third device. The first device may determine or derive the third priority based on supported services or logical channels between the first device and the third device. The first device may determine, derive, or set the third priority as the highest priority of supported logical channel between the first device and the third device.

Alternatively, the first device may determine to utilize the third sidelink resource to deliver a third data packet associated with a third priority. The third data packet may be delivered from the first device to at least the third device. The destination identity of the third data packet may be associated with at least the third device. Alternatively, the third data packet may not be delivered to the third device. The destination identity of the third data packet may not be associated with the third device.

In one embodiment, the specific condition may be that the third sidelink resource overlaps with one sidelink resource of the one or more sidelink resources and the third priority is (relatively) higher than the second priority. (For instance, the third priority value is smaller than the second priority value). The specific condition may be that the third sidelink resource is in one slot of the one or more slots in the carrier or cell and the third priority is (relatively) higher than the second priority. (For instance, the third priority value is smaller than the second priority value).

In one embodiment, the specific condition may be that the third sidelink resource overlaps with one sidelink resource of the one or more sidelink resources and the third priority is a specific priority or is (relatively) higher than the specific priority. The specific condition may be that the third sidelink resource is in one slot of the one or more slots in the carrier or cell and the third priority is a specific priority or is (relatively) higher than the specific priority. The specific priority may be (pre-)configured or specified. The priority value of the specific priority may be 1. The specific priority may be determined or derived from the second priority. The priority value of the specific priority may be the same as a value of "the priority value of the second priority+a priority offset". The priority value of the specific priority may be the same as a value of "the priority value of the second priority−a priority offset". The priority offset may be (pre-)configured or specified.

In one embodiment, the specific condition may be that the third sidelink resource overlaps with one sidelink resource of the one or more sidelink resources and the third data packet comprises sidelink data from specific logical channel(s) or associated with specific service (requirement). The specific condition may be that the third sidelink resource is in one slot of the one or more slots in the carrier or cell and the third data packet comprises sidelink data from specific logical channel(s) or associated with specific service (requirement). The specific logical channel may be (pre-)configured or specified. The specific logical channel may be a logical channel (pre-)configured as not restricted by the resource set. The specific service requirement may be low latency requirement. The specific service may be a service with low latency requirement. The first data packet may be URLLC data.

In one embodiment, the first device may perform the third sidelink transmission on the third sidelink resource. The first device may not perform sidelink reception or monitoring in the slot of the third sidelink resource. The third sidelink resource may be in the first sidelink resource pool. Alternatively, the third sidelink resource may be in the second sidelink resource pool.

In one embodiment, the third sidelink resource and the one sidelink resource of the one or more sidelink resources may overlap (partly or fully) in time domain and may not overlap in frequency domain. Alternatively, the third sidelink resource and the one sidelink resource of the one or more sidelink resources may overlap (partly or fully) in time domain and may overlap (partly or fully) in frequency domain.

In one embodiment, overlap of the third sidelink resource and the one sidelink resource of the one or more sidelink resources may mean, refer, or comprise that the third sidelink resource and the one sidelink resource are in a same slot.

In one embodiment, the first device could acquire the information of the third sidelink resource, after the first device sends or reports the resource set to the second device. Alternatively, the first device could acquire the information of the third sidelink resource, before the first device sends or reports the resource set to the second device. The first device could detect the occurrence of the specific condition, after the first device sends or reports the resource set to the second device.

In one embodiment, one sidelink resource in the resource set may mean a time-frequency resource. One sidelink resource may be located in one slot in time domain and comprise at least one sub-channel in frequency domain. One slot among the one or more slots may comprise one or multiple sidelink resources among the one or more sidelink resources in the resource set. The slot number of the one or more slots may be smaller than or equal to the resource number of the one or more sidelink resources in the resource set.

In one embodiment, the one or more sidelink resources in the resource set may be or may comprise all sidelink resources (located) in the one or more slots in the carrier or cell. The one or more sidelink resources in the resource set may be or may comprise all sidelink resources (located) in the one or more slots in the first resource pool. The first device may send or report the information of the one or more slots. The first device may not send or report sub-channel information of the one or more sidelink resources.

In one embodiment, one resource set may comprise or indicate sidelink resource(s) (only) within one sidelink resource pool. The first device may send or report multiple resource sets associated with multiple sidelink resource pools. The first device may inform the pool index of the first sidelink resource pool when sending or reporting the resource set to the second device.

In one embodiment, one resource set may comprise or indicate sidelink resource(s) in multiple sidelink resource pools. The first device may send or report one resource set associated with multiple sidelink resource pools. The first device may inform the carrier or cell index of the carrier or cell when sending or reporting the resource set to the second device. The second sidelink resource pool may be different from the first sidelink resource pool. The second sidelink resource pool may be in a different carrier or cell from the first sidelink resource pool. Alternatively, the second sidelink resource pool may be in same carrier or cell from the first sidelink resource pool.

In one embodiment, the first device may trigger to send or report a new resource set to the second device, when the specific condition is detected. The first device may trigger to send or report a new resource set to the second device, when the specific condition is detected and the time gap between the slot of the third resource and the slot of detecting the specific condition is larger than a time threshold. The time threshold may comprise any of the first device's generation or processing time of the new resource set, the first device's transmission time of the new resource set, the second device's receiving or processing time of the new resource set, or the second device's processing time of sidelink resource (re-)selection.

In one embodiment, the new resource set may not comprise any sidelink resources overlapped (partly or fully) with the third sidelink resource in time domain. The new resource set may not comprise any sidelink resources overlapped (partly or fully) with the third sidelink resource in time domain and overlapped (partly or fully) with the third sidelink resource in frequency domain. The first device could preclude or prevent from including any sidelink resources, overlapped (partly or fully) with the third sidelink resource in time domain, in the new resource set. The first device could preclude or prevent from including any sidelink resources, overlapped (partly or fully) with the third sidelink resource in time domain and overlapped (partly or fully) with the third sidelink resource in frequency domain, in the new resource set. The first device could generate the new resource set to exclude the occurrence of the detected specific condition.

In one embodiment, if the second device and the third device are the same device, and if the transmission timing of the one resource set is earlier than the reception time of the another resource set, the first device may generate, derive, or determine the new resource set with some coordination or comparison based on the resource set and the another resource set. If the third sidelink resource is within the one resource set and within the another resource set, the coordination or comparison may mean that the first device coordinates or determines whether the first device intends or determines to utilize the third sidelink resource for performing sidelink transmission.

In one embodiment, if the third sidelink resource is within the one resource set and within another resource set, the coordination or comparison may mean that the first device coordinates or determines whether the second device could perform sidelink transmission and/or the first device may not perform sidelink transmission on the third sidelink resource or at the timing of the third sidelink resource or at the slot comprising the third sidelink resource. If the third sidelink resource is within the one resource set and with another resource set, the first device could coordinate or determine whether to include the third sidelink resource in the new resource set. If the first device considers, determines, or coordinates to monitor for the third sidelink resource, the first device could include the third sidelink resource in the new resource set. If the first device considers, determines, or coordinates not to monitor for the third sidelink resource and/or the slot containing the third sidelink resource, the first device may not include the third sidelink resource in the new resource set.

Such coordinated resource in the new resource set may not be allowed to occur or locate in a timing or slot before a timing where the second device receives sidelink transmission comprising the new resource set plus a processing offset. Such coordinated resource in the new resource set may not be allowed to occur or locate in a timing or slot before a timing where the first device transmits a (new) sidelink transmission comprising the new resource set plus a processing offset. The processing offset may be used for the second device to decode or process the sidelink transmission comprising the new resource set, and/or (re-)select resource based on the new resource set, and/or trigger re-evaluation, and/or trigger preempting.

In one embodiment, the sidelink reception or monitoring may mean PSCCH reception or monitoring. The sidelink reception or monitoring may mean PSCCH and/or PSSCH reception or monitoring. The sidelink reception or monitoring may comprise PSFCH reception or monitoring. Alternatively, the sidelink reception or monitoring may not mean PSFCH reception or monitoring.

Method b-2

A first device may send or report a resource set to a second device. The second device may take the resource set into account when the second device performs resource selection for performing sidelink transmission (to at least the first device).

In one embodiment, the resource set may comprise one or more sidelink resources not preferred for the second device's transmission (to at least the first device). The resource set may comprise one or more sidelink resources not preferred for the first device's reception (e.g. from the second device or from other device(s)). The resource set may comprise one or more sidelink resources not preferred for intended receiver(s), at least the first device's receiver, of the second device's transmission.

In one embodiment, the one or more sidelink resources in the resource set may be (located) in one or more slots. The one or more sidelink resources may be in a first sidelink resource pool in a carrier or cell. The carrier or cell may comprise at least the first sidelink resource pool and a second sidelink resource pool.

In one embodiment, the first device may derive or determine a contrary resource set at least based on the resource set. The contrary resource set may comprise another one or more sidelink resources preferred for the second device's transmission (to at least the first device). The contrary resource set may comprise another one or more sidelink resources preferred for the first device's reception (e.g. from the second device or from other device(s)). The contrary resource set may comprise another one or more sidelink resources preferred for intended receiver(s), at least the first device's receiver, of the second device's transmission. The first device may perform method b-1 based on the contrary resource set.

In one embodiment, the first device may not restrict to perform sidelink reception or monitoring for the one or more sidelink resources. The first device does not restrict to perform sidelink reception or monitoring in the one or more slots in the carrier or cell. More specifically, the first device may (be able or allowed to) perform a third sidelink transmission on one sidelink resource of the one or more sidelink resources. More specifically, the first device may (be able or allowed to) perform a third sidelink transmission in one slot of the one or more slots in the carrier or cell.

In one embodiment, the first device may receive a sidelink grant from network node (to the first device), wherein the sidelink grant schedules or indicates at least a third sidelink resource. Alternatively, the first device may receive a third sidelink control information or a sidelink grant from a third device, which reserves or indicates at least a third sidelink resource. The first device may receive another resource set from a third device, which comprise at least a third sidelink resource. The third sidelink resource in the another resource set may be preferred for the first device's transmission (to at least the third device).

In one embodiment, the third sidelink resource may overlap with one sidelink resource of the one or more sidelink resources. The third sidelink resource may be in one slot of the one or more slots in the carrier or cell.

In one embodiment, the first device may perform the third sidelink transmission on the third sidelink resource. The third sidelink resource may be in the first sidelink resource pool. Alternatively, the third sidelink resource may be in the second sidelink resource pool.

In one embodiment, the third sidelink resource and the one sidelink resource of the one or more sidelink resources may overlap (partly or fully) in time domain and may not overlap in frequency domain. Alternatively, the third sidelink resource and the one sidelink resource of the one or more sidelink resources may overlap (partly or fully) in time domain and may overlap (partly or fully) in frequency domain.

In one embodiment, overlap of the third sidelink resource and the one sidelink resource of the one or more sidelink resources may mean, refer, or comprise that the third sidelink resource and the one sidelink resource are in a same slot.

In one embodiment, one sidelink resource in the resource set may mean a time-frequency resource. One sidelink resource may be located in one slot in time domain and comprise at least one sub-channel in frequency domain. One slot among the one or more slots may comprise one or multiple sidelink resources among the one or more sidelink resources in the resource set. The slot number of the one or more slots may be smaller than or equal to the resource number of the one or more sidelink resources in the resource set.

In one embodiment, the one or more sidelink resources in the resource set may be or may comprise all sidelink resources (located) in the one or more slots in the carrier or cell. The one or more sidelink resources in the resource set may be or may comprise all sidelink resources (located) in the one or more slots in the first resource pool. The first device may send or report the information of the one or more slots. The first device may not send or report sub-channel information of the one or more sidelink resources.

In one embodiment, one resource set may comprise or indicate sidelink resource(s) (only) within one sidelink resource pool. The first device may send or report multiple resource sets associated with multiple sidelink resource pools. The first device may inform the pool index of the first sidelink resource pool when sending or reporting the resource set to the second device.

In one embodiment, one resource set may comprise or indicate sidelink resource(s) in multiple sidelink resource pools. The first device may send or report one resource set associated with multiple sidelink resource pools. The first device may inform the carrier or cell index of the carrier or cell when sending or reporting the resource set to the second device. The second sidelink resource pool may be different from the first sidelink resource pool. The second sidelink resource pool may be in a different carrier or cell from the first sidelink resource pool. Alternatively, the second sidelink resource pool may be in same carrier or cell from the first sidelink resource pool.

In one embodiment, the sidelink reception or monitoring may mean PSCCH reception or monitoring. The sidelink reception or monitoring may mean PSCCH and/or PSSCH reception or monitoring. The sidelink reception or monitoring may comprise PSFCH reception or monitoring. Alternatively, the sidelink reception or monitoring may not mean PSFCH reception or monitoring.

For all Above Concepts, Methods, Alternatives and Embodiments:

Any of above methods, alternatives and embodiments may be combined or applied simultaneously.

In one embodiment, after or in response to perform a sidelink transmission comprising the resource set (to the second device), the first device may receive or detect Hybrid Automatic Repeat reQuest (HARQ) feedback associated with the sidelink transmission (from the second device). If the first device receives or detects the HARQ feedback as Acknowledgement (ACK), or if the first considers successful reception of the sidelink transmission in the second device, the first device could (start to) perform or apply any of above methods or embodiments. If the first device receives or detects the HARQ feedback as NACK, or if the first considers non-successful reception of the sidelink transmission in the second device, the first device may not perform or apply above methods or embodiments.

Alternatively, after or in response to perform a sidelink transmission comprising the resource set (to the second device), the first device may (start to) perform or apply any of above methods or embodiments. After or in response to perform a sidelink transmission comprising the resource set (to the second device), the first device may (start to) perform or apply any of above methods or embodiments without regarding or considering HARQ feedback associated with the sidelink transmission.

In one embodiment, the sidelink grant may be dynamic sidelink grant. The sidelink grant may be a downlink control information transmitted from network node, wherein the downlink control information indicates or schedules one or more than one sidelink resources for the first device.

In one embodiment, the sidelink grant may be configured sidelink grant. The sidelink grant may be type-1 configured sidelink grant (activation without DCI). The sidelink grant may be type-2 configured sidelink grant (which need DCI for activation). The sidelink grant may be a downlink control information transmitted from network node, wherein the downlink control information is to activate a SL SPS (configuration) for the first device.

In one embodiment, the sidelink grant may be a scheduling sidelink control information transmitted from a specific device within a sidelink group, wherein the scheduling sidelink control information indicates or schedules one or more than one sidelink resources for the first device. The first device could utilize the one or more than one sidelink resources for performing one or more than one sidelink transmission to devices within the sidelink group.

In one embodiment, the first device may be capable to perform at most one sidelink transmission in a sidelink slot in a carrier or cell. The allowed number may be one.

Additionally or alternative, the first device may be capable to perform (simultaneously) multiple sidelink transmissions in a sidelink slot in a carrier or cell. The multiple sidelink transmissions in a sidelink slot in a carrier or cell may be limited or restricted with the allowed number. The allowed number may be the maximum number of the multiple sidelink transmissions in a sidelink slot in a carrier or cell.

In one embodiment, when the number of the multiple sidelink transmissions in a sidelink slot in a carrier or cell does not exceed the allowed number, and if the total transmit power of the multiple sidelink transmissions in the sidelink slot exceeds the maximum allowed transmit power (e.g. $P_{CMAX}$), the first device may transmit the sidelink transmission(s) delivering a data packet associated with higher or highest relative priority (without power scaling). The first device may drop the sidelink transmission(s) delivering a data packet with a lower or lowest relative priority or perform power scaling (e.g. reduce transmit power) on the sidelink transmission(s) delivering a data packet with a lower/lowest relative priority.

In one embodiment, the first device may have, maintain, or establish multiple sidelink links or connections on PC5 interface. For different sidelink links or connections, the first device may perform sidelink transmission or reception to or from different paired device(s).

In one embodiment, the first device may have, maintain, or establish a first sidelink link or connection and a second sidelink link or connection. The paired device of the first sidelink link or connection may be different from the paired device of the second sidelink link or connection. In one embodiment, the sidelink logical channel(s) associated with (the paired device of) the first sidelink link or connection may be separate or independent from the sidelink logical channel(s) associated with (the paired device of) the second sidelink link or connection.

In one embodiment, the first sidelink resource may be utilized for sidelink transmission, reception, or communication of the first sidelink link or connection. The first sidelink link or connection may be a unicast link or connection. The first sidelink link or connection may be a groupcast link or connection. The first sidelink link or connection may be a broadcast link or connection. The first device may perform sidelink transmission, reception, or communication of the first sidelink link or connection in the first sidelink resource pool. The first device may perform sidelink transmission, reception, or communication of the first sidelink link or connection associated with a first resource allocation mode.

In one embodiment, the third sidelink resource may be utilized for sidelink transmission, reception, or communication of the second sidelink link or connection. The second sidelink link or connection may be a unicast link or connection. The second sidelink link or connection may be a groupcast link or connection. The second sidelink link or connection may be a broadcast link or connection.

In one embodiment, the first device may perform sidelink transmission, reception, or communication of the second sidelink link or connection in the second sidelink resource pool. The second sidelink resource pool and the first sidelink resource pool may be at least Frequency Division Multiplexing (FDM) in a same cell or carrier. The frequency resources of the second sidelink resource pool may be different or separate from frequency resources of the first sidelink resource pool. The second sidelink resource pool and the first sidelink resource pool may be at least FDM in a same cell or carrier, and the slot belonging to the first sidelink resource pool could belong to the second sidelink resource pool.

In one embodiment, the network node may be a gNB, a base station, or a RSU. In particular, the network node may be a network-type RSU or a UE-type RSU. The network node may be replaced or represented by a specific device within a sidelink group.

In one embodiment, the data packet may be associated with at least a sidelink logical channel. The sidelink data could come from at least a sidelink logical channel. The first data packet may be associated with at least a first sidelink logical channel. The second data packet may be associated with at least a second sidelink logical channel. The first sidelink logical channel may be separate or independent from the second sidelink logical channels.

In one embodiment, the sidelink transmission may be PSSCH and/or PSCCH. The sidelink control information may be delivered in PSCCH. Preferably, the sidelink control information may comprise 1$^{st}$ stage SCI. The sidelink control information may comprise 2$^{nd}$ stage SCI.

In one embodiment, the sidelink slot may mean slot for sidelink. A sidelink slot may be represented as a Transmission Time Interval (TTI). A TTI may be a subframe (for sidelink). A TTI may comprise multiple symbols, e.g. 12 or 14 symbols. The TTI may be a slot (fully/partially) comprising sidelink symbols. The TTI may mean a transmission time interval for a sidelink (data) transmission. A sidelink slot or a slot for sidelink may contain all OFDM symbols available for sidelink transmission. A sidelink slot or a slot for sidelink may contain a consecutive number symbols available for sidelink transmission. A sidelink slot or a slot for sidelink means that a slot is included in a sidelink resource pool.

In one embodiment, the symbol may mean a symbol indicated or configured for sidelink. A sub-channel may be a unit for sidelink resource allocation or scheduling (for PSSCH). A sub-channel may comprise multiple contiguous Physical Resource Blocks (PRBs) in frequency domain. The number of PRBs for each sub-channel may be (pre-)configured for a sidelink resource pool. A sidelink resource pool (pre-)configuration may indicate or configure the number of PRBs for each sub-channel. The number of PRBs for each sub-channel may be any of 4, 5, 6, 8, 9, 10, 12, 15, 16, 18, 20, 25, 30, 48, 50, 72, 75, 96, or 100. A sub-channel may be represented as a unit for sidelink resource allocation or scheduling. A sub-channel may mean a PRB. A sub-channel may mean a set of consecutive PRBs in frequency domain. A sub-channel may mean a set of consecutive resource elements in frequency domain.

In one embodiment, the SL HARQ feedback may comprise ACK or NACK. The SL HARQ feedback for a data packet may be derived based on whether the receiving device successfully receives or decodes the data packet delivered in the associated sidelink (re)transmission.

In one embodiment, a data packet may mean a TB. A data packet may mean a Medium Access Control (MAC) Protocol Data Unit (PDU). A data packet may mean one or two TB(s) delivered or included in one sidelink (re)transmission.

In one embodiment, the sidelink transmission or reception may be device-to-device transmission or reception. The sidelink transmission or reception may be Vehicle-to-Everything (V2X) transmission or reception. The sidelink transmission or reception may be P2X transmission or reception. The sidelink transmission or reception may be on PC5 interface.

In one embodiment, the PC5 interface may be wireless interface for communication between device and device. The PC5 interface may be wireless interface for communication between devices. The PC5 interface may be wireless interface for communication between UEs. The PC5 interface may be wireless interface for V2X or P2X communication. The Uu interface may be wireless interface for communication between network node and device. The Uu interface may be wireless interface for communication between network node and UE.

In one embodiment, the first device and the second device may be different devices. The first device may be a UE. The first device may be a vehicle UE. The first device may be a V2X UE.

In one embodiment, the second device may be a UE. The second device may be a vehicle UE. The second device may be a V2X UE.

Figure 14:
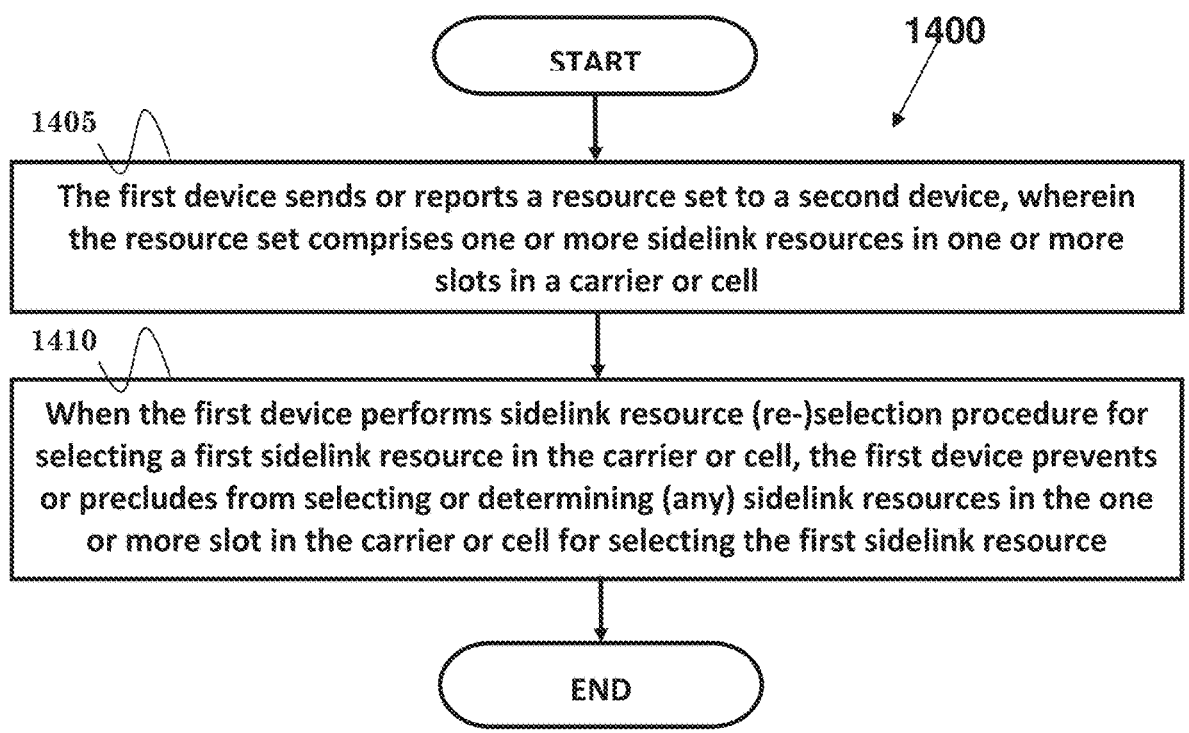
FIG. 14 is a flow chart according to one exemplary embodiment.

FIG. 14 is a flow chart 1400 according to one exemplary embodiment from the perspective of a first device to perform sidelink communication. In step 1405, the first device sends or reports a resource set to a second device, wherein the resource set comprises one or more sidelink resources in one or more slots in a carrier or cell. In step 1410, when the first device performs sidelink resource (re-)selection procedure for selecting a first sidelink resource in the carrier or cell, the first device prevents or precludes from selecting or determining (any) sidelink resources in the one or more slot in the carrier or cell for selecting the first sidelink resource.

In one embodiment, the first device could exclude (all) candidate sidelink resources in the one or more slots for selecting the first sidelink resource. The one or more sidelink resources may be preferred for the second device's transmission (to at least the first device).

In one embodiment, the first device could perform the sidelink resource (re-)selection procedure for selecting the first sidelink resource after the first device sends or reports the resource set to the second device. The first device could perform the sidelink resource (re-)selection procedure for selecting the first sidelink resource within a time duration associated with the sending or reporting resource set. The first device could perform the sidelink resource (re-)selection procedure for selecting the first sidelink resource within a time duration associated with the sending or reporting timing of the resource set.

In one embodiment, the first device may utilize or use the first sidelink resource for transmitting or delivering a first data packet. The first data packet may be associated with a first priority. Furthermore, if the first priority is (relatively) lower than a second priority or a specific priority, the first device could perform the sidelink resource (re-)selection procedure for selecting the first sidelink resource with above prevention or preclusion. In addition, if the first priority is (relatively) higher than the second priority or the specific priority, the first device could perform sidelink resource (re-)selection procedure for selecting the first sidelink resource without above prevention or preclusion. The second priority may be associated with the one or more sidelink resources or associated with the resource set, and/or the specific priority may be (pre-)configured, specified, or derived based on the second priority.

In one embodiment, if the first data packet comprises sidelink data from specific logical channel(s) or associated with specific service (requirement), the first device could perform sidelink resource (re-)selection procedure for selecting the first sidelink resource without above exclusion or prevention or preclusion. Furthermore, if the first data packet does not comprise sidelink data from specific logical channel(s) or associated with specific service requirement, the first device could perform sidelink resource (re-)selection procedure for selecting the first sidelink resource with above exclusion or prevention or preclusion. The first sidelink resource may be in the same sidelink resource pool as the one or more sidelink resources. The first sidelink resource may be in a different sidelink resource pool from the one or more sidelink resources.

Referring back to FIGS. 3 and 4, in one exemplary embodiment of a first device to perform sidelink communication. The first device 300 includes a program code 312 stored in the memory 310. The CPU 308 could execute program code 312 to enable the first device (i) to send or report a resource set to a second device, wherein the resource set comprises one or more sidelink resources in one or more slots in a carrier or cell, and (ii) to prevent or preclude from selecting or determining (any) sidelink resources in the one or more slot in the carrier or cell for selecting the first sidelink resource when the first device performs sidelink resource (re-)selection procedure for selecting a first sidelink resource in the carrier or cell, the first device. Furthermore, the CPU 308 can execute the program code 312 to perform all of the above-described actions and steps or others described herein.

Figure 15:
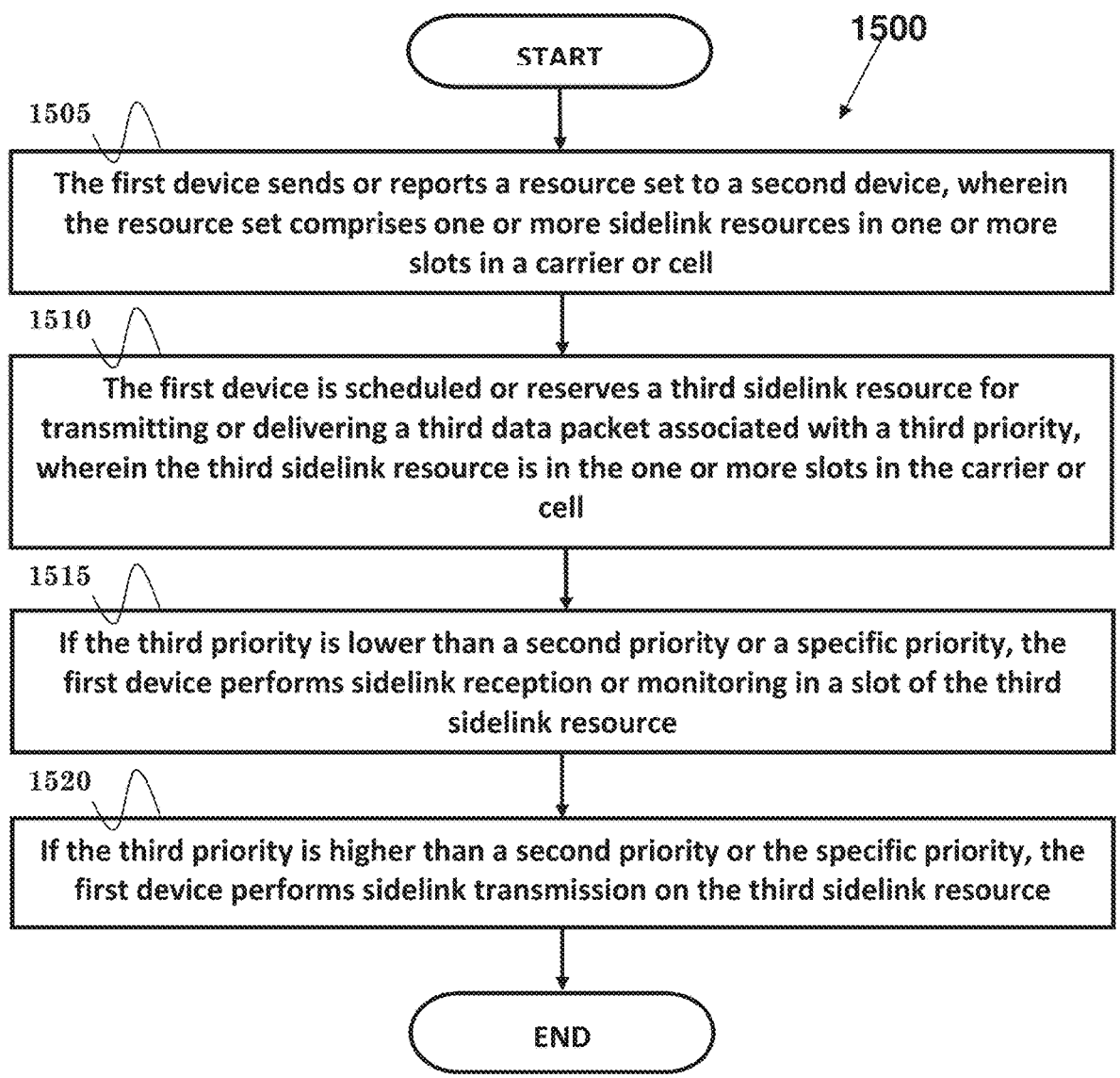
FIG. 15 is a flow chart according to one exemplary embodiment.

FIG. 15 is a flow chart 1500 according to one exemplary embodiment from the perspective of a first device to perform sidelink communication. In step 1505, the first device sends or reports a resource set to a second device, wherein the resource set comprises one or more sidelink resources in one or more slots in a carrier or cell. In step 1510, the first device is scheduled or reserves a third sidelink resource for transmitting or delivering a third data packet associated with a third priority, wherein the third sidelink resource is in the one or more slots in the carrier or cell. In step 1515, if the third priority is lower than a second priority or a specific priority, the first device performs sidelink reception or monitoring in a slot of the third sidelink resource. In step 1520, if the third priority is higher than a second priority or the specific priority, the first device performs sidelink transmission on the third sidelink resource.

In one embodiment, the one or more sidelink resources may be preferred for the second device's transmission (to at least the first device). The second priority may be associated with the one or more sidelink resources or associated with the resource set, and/or the specific priority may be (pre-)configured, specified or derived based on the second priority.

In one embodiment, the first device could receive a sidelink grant from network node (to the first device), wherein the sidelink grant schedules or indicates at least the third sidelink resource. The first device could reserve or select the third sidelink resource when the first device performs sidelink resource (re-)selection procedure. The first device could receive a third sidelink control information or a sidelink grant from a third device, which reserves or indicates at least the third sidelink resource. The first device could receive another resource set from a third device, wherein the another resource set reserves or comprises at least the third sidelink resource.

In one embodiment, the first device could acquire the information of the third sidelink resource after the first device sends or reports the resource set to the second device. The third sidelink resource may be in the same sidelink resource pool as the one or more sidelink resources. The third sidelink resource may be in different sidelink resource pool from the one or more sidelink resources.

Referring back to FIGS. 3 and 4, in one exemplary embodiment of a first device to perform sidelink communication. The first device 300 includes a program code 312 stored in the memory 310. The CPU 308 could execute program code 312 to enable the first device (i) to send or report a resource set to a second device, wherein the resource set comprises one or more sidelink resources in one or more slots in a carrier or cell, (ii) to be scheduled or to reserve a third sidelink resource for transmitting or delivering a third data packet associated with a third priority, wherein the third sidelink resource is in the one or more slots in the carrier or cell, (iii) to perform sidelink reception or monitoring in a slot of the third sidelink resource if the third priority is lower than a second priority or a specific priority, and (iv) to perform sidelink transmission on the third sidelink resource if the third priority is higher than a second priority or the specific priority. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a first device to perform sidelink transmission, comprising:
sending or reporting a resource set to a second device, wherein the resource set comprises one or more sidelink resources in one or more slots in a same carrier or cell;
performing a sidelink resource selection procedure for selecting a first sidelink resource for sidelink transmission in the same carrier or cell after sending or reporting the resource set comprising the one or more sidelink resources in the one or more slots in the same carrier or cell, wherein the first sidelink resource is utilized for transmitting or delivering a first data packet associated with a first priority in the same carrier or cell; and
when the first priority is lower than a second priority associated with the one or more sidelink resources in the one or more slots in the same carrier or cell, preventing or precluding from selecting or determining sidelink resources in the one or more slots associated with the sent or reported resource set in the same carrier or cell for selecting the first sidelink resource.

2. The method of claim 1, wherein the first device excludes candidate sidelink resources in the one or more slots for selecting the first sidelink resource.

3. The method of claim 1, wherein the one or more sidelink resources is preferred for a transmission by the second device to at least the first device.

4. The method of claim 1, wherein at least one of:
the first device performs the sidelink resource selection procedure for selecting the first sidelink resource after the first device sends or reports the resource set to the second device,
the first device performs the sidelink resource selection procedure for selecting the first sidelink resource within a time duration associated with the sending or reporting of the resource set, or
the first device performs the sidelink resource selection procedure for selecting the first sidelink resource within a time duration associated with a timing of the sending or reporting of the resource set.

5. The method of claim 1, wherein:
the sidelink transmission is Physical Sidelink Shared Channel (PSSCH) transmission.

6. The method of claim 5, wherein:
when the first priority is higher than the second priority, the first device performs the sidelink resource selection procedure for selecting the first sidelink resource without the prevention or preclusion.

7. The method of claim 6, wherein:
the second priority is associated with the one or more sidelink resources or associated with the resource set.

8. The method of claim 5, wherein at least one of:
when the first data packet comprises sidelink data from specific logical channels or associated with specific service requirement, the first device performs the sidelink resource selection procedure for selecting the first sidelink resource without the exclusion or prevention or preclusion, or
when the first data packet does not comprise sidelink data from specific logical channels or associated with specific service requirement, the first device performs the sidelink resource selection procedure for selecting the first sidelink resource with the exclusion or prevention or preclusion.

9. The method of claim 1, wherein the first sidelink resource is in the same sidelink resource pool as the one or more sidelink resources, or the first sidelink resource is in a different sidelink resource pool from the one or more sidelink resources.

10. A method of a first device to perform sidelink transmission or reception, comprising:
sending or reporting a resource set to a second device, wherein the resource set comprises one or more sidelink resources in one or more slots in a same carrier or cell;
scheduling or reserving a third sidelink resource to transmit or deliver a third data packet associated with a third priority, wherein the third sidelink resource is in the one or more slots associated with the sent or reported resource set in the same carrier or cell;
when the third priority is lower than a second priority or a specific priority, performing sidelink reception or monitoring in a slot of the third sidelink resource; and when the third priority is higher than the second priority or the specific priority, performing sidelink transmission on the third sidelink resource.

11. The method of claim 10, wherein the one or more sidelink resources is preferred for a transmission by the second device to at least the first device.

12. The method of claim 10, wherein at least one of:
the second priority is associated with at least one of the one or more sidelink resources or the resource set, or
the specific priority is configured, pre-configured, specified or derived based on the second priority.

13. The method of claim 10, comprising at least one of:
receiving a sidelink grant from network node, wherein the sidelink grant schedules or indicates at least the third sidelink resource,
receiving at least one of a third sidelink control information or a sidelink grant, from a third device, which reserves or indicates at least the third sidelink resource, or
receiving another resource set from a fourth device, wherein the another resource set at least one of reserves or comprises at least the third sidelink resource.

14. The method of claim 10, wherein the first device acquires information of the third sidelink resource after the first device sends or reports the resource set to the second device.

15. The method of claim 10, wherein the third sidelink resource is in the same sidelink resource pool as the one or more sidelink resources, or the third sidelink resource is in a different sidelink resource pool from the one or more sidelink resources.

16. A first device to perform sidelink transmission, comprising:
a control circuit;
a processor installed in the control circuit; and
a memory installed in the control circuit and operatively coupled to the processor;
wherein the processor is configured to execute a program code stored in the memory to:
send or report a resource set to a second device, wherein the resource set comprises one or more sidelink resources in one or more slots in a same carrier or cell;
perform a sidelink resource selection procedure for selecting a first sidelink resource for sidelink transmission in the same carrier or cell after sending or reporting the resource set comprising the one or more sidelink resources in the one or more slots in the same carrier or cell, wherein the first sidelink resource is utilized for transmitting or delivering a first data packet associated with a first priority in the same carrier or cell; and
when the first priority is lower than a second priority associated with the one or more sidelink resources in the one or more slots in the same carrier or cell, prevent or preclude from selecting or determining sidelink resources in the one or more slots associated with the sent or reported resource set in the same carrier or cell for selecting the first sidelink resource.

17. The first device of claim 16, wherein the first device excludes candidate sidelink resources in the one or more slots for selecting the first sidelink resource.

18. The first device of claim 16, wherein the one or more sidelink resources is preferred for a transmission by the second device to at least the first device.

19. The first device of claim 16, wherein the processor is further configured to execute a program code stored in the memory to at least one of:
perform the sidelink resource selection procedure for selecting the first sidelink resource after the first device sends or reports the resource set to the second device,
perform the sidelink resource selection procedure for selecting the first sidelink resource within a time duration associated with the sending or reporting of the resource set, or
perform the sidelink resource selection procedure for selecting the first sidelink resource within a time duration associated with a timing of the sending or reporting of the resource set.

20. The first device of claim 16, wherein at least one of:
the first device utilizes the first sidelink resource for transmitting or delivering a first data packet,
the sidelink transmission is Physical Sidelink Shared Channel (PSSCH) transmission, or
the first data packet is associated with a first priority,
wherein when the first priority is lower than a second priority or a specific priority, the first device performs the sidelink resource selection procedure for selecting the first sidelink resource with the prevention or preclusion, or
when the first priority is higher than the second priority or the specific priority, the first device performs the sidelink resource selection procedure for selecting the first sidelink resource without the prevention or preclusion.

* * * * *